United States Patent
Miyachi et al.

(10) Patent No.: US 9,249,242 B2
(45) Date of Patent: Feb. 2, 2016

(54) METHOD FOR MANUFACTURING LIQUID CRYSTAL DISPLAY DEVICE

(75) Inventors: Koichi Miyachi, Osaka (JP); Isamu Miyake, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 0 days.

(21) Appl. No.: 14/241,573

(22) PCT Filed: Aug. 1, 2012

(86) PCT No.: PCT/JP2012/069558
§ 371 (c)(1),
(2), (4) Date: Feb. 27, 2014

(87) PCT Pub. No.: WO2013/031462
PCT Pub. Date: Mar. 7, 2013

(65) Prior Publication Data
US 2014/0360860 A1    Dec. 11, 2014

(30) Foreign Application Priority Data

Aug. 29, 2011   (JP) .................................. 2011-186445

(51) Int. Cl.
*G02F 1/1337*      (2006.01)
*C08F 22/10*       (2006.01)
(Continued)

(52) U.S. Cl.
CPC . *C08F 22/10* (2013.01); *C08F 2/48* (2013.01); *C08F 122/105* (2013.01); *G02F 1/133788* (2013.01); *C08F 2500/26* (2013.01)

(58) Field of Classification Search
CPC . G02F 1/133788; C08F 22/10; C08F 122/105
See application file for complete search history.

(56) References Cited

U.S. PATENT DOCUMENTS 5,831,707 A * 11/1998 Ota et al. ............... 349/141
5,889,571 A *  3/1999 Kim et al. ............... 349/124
(Continued)

FOREIGN PATENT DOCUMENTS

JP      2001-066602 A    3/2001
JP      2001-249363 A    9/2001
(Continued)

OTHER PUBLICATIONS

Official Communication issued in International Patent Application No. PCT/JP2012/069558, mailed on Oct. 16, 2012.
(Continued)

*Primary Examiner* — James Dudek
(74) *Attorney, Agent, or Firm* — Keating & Bennett, LLP

(57) ABSTRACT

The present invention provides a method for manufacturing a liquid crystal display device, which hardly causes alignment defects in the case of forming a horizontal alignment film by employing a photo-alignment treatment. The method for manufacturing a liquid crystal display device of the present invention includes a step of forming a horizontal alignment film by carrying out a photo-alignment treatment of irradiating a photo-alignment film material applied to at least one substrate of a pair of substrates with light, wherein the photo-alignment treatment is a treatment for irradiating the same region with light two or more times from a slanting direction with respect to a surface of the at least one substrate of the pair of substrates, and at least two of lights applied two or more times in the photo-alignment treatment are polarized lights applied from directions mutually different at 90° or greater.

15 Claims, 19 Drawing Sheets

(51) Int. Cl.
*C08F 122/10* (2006.01)
*C08F 2/48* (2006.01)

(56) References Cited

U.S. PATENT DOCUMENTS

| | | | |
|---|---|---|---|
| 6,177,972 B1 | 1/2001 | Held et al. | |
| 6,215,539 B1* | 4/2001 | Schadt et al. | 349/124 |
| 6,226,066 B1* | 5/2001 | Reznikov et al. | 349/124 |
| 2002/0033442 A1* | 3/2002 | Toko et al. | 250/214.1 |
| 2003/0086044 A1 | 5/2003 | Inoue et al. | |
| 2005/0116200 A1 | 6/2005 | Nakanishi et al. | |
| 2005/0136196 A1 | 6/2005 | Kataoka | |
| 2005/0140837 A1* | 6/2005 | Crawford et al. | 349/42 |
| 2005/0253988 A1 | 11/2005 | Inoue et al. | |
| 2009/0046221 A1 | 2/2009 | Miyachi | |
| 2009/0103011 A1 | 4/2009 | Bernatz et al. | |
| 2009/0141215 A1 | 6/2009 | Bremer et al. | |
| 2009/0269515 A1 | 10/2009 | Kataoka | |
| 2009/0324853 A1 | 12/2009 | Bernatz et al. | |
| 2011/0090429 A1 | 4/2011 | Miyachi | |
| 2012/0038851 A1 | 2/2012 | Miyachi | |
| 2012/0287372 A1 | 11/2012 | Miyachi | |

FOREIGN PATENT DOCUMENTS

| | | |
|---|---|---|
| JP | 2002-023164 A | 1/2002 |
| JP | 2004-070185 A | 3/2004 |
| JP | 2004-286984 A | 10/2004 |
| JP | 2005-107468 A | 4/2005 |
| JP | 2005-181582 A | 7/2005 |
| JP | 2007-092000 A | 4/2007 |
| JP | 4175826 B2 | 11/2008 |
| JP | 4237977 B2 | 3/2009 |
| JP | 2009-102639 A | 5/2009 |
| JP | 2009-132718 A | 6/2009 |
| JP | 2009-265308 A | 11/2009 |
| JP | 2010-033093 A | 2/2010 |
| JP | 2010-039332 A | 2/2010 |
| WO | 2006/043485 A1 | 4/2006 |

OTHER PUBLICATIONS

Kikuchi et al., "Polymer-stabilized liquid crystal blue phases", Nature Materials, vol. 1, Sep. 2002, pp. 64-68.

Nagatake et al., "Reduction of EO Hysteresis of Photo-Aligned IPS-LCDs with Polymer Stabilized Method", Proceedings of The Japanese Liquid Crystal Society Annual Meetings 2010, Sep. 2010, 2b02, 2 pages.

Nagatake et al., "Hysteresis Reduction in EO Characteristics of Photo-Aligned IPS-LCDs with Polymer-Surface-Stabilized Method", International Display Workshops 2010, Dec. 2010, pp. 89-92.

* cited by examiner

METHOD FOR MANUFACTURING LIQUID CRYSTAL DISPLAY DEVICE

TECHNICAL FIELD

The present invention relates to a method for manufacturing a liquid crystal display device. More specifically, the present invention relates to a method for manufacturing a liquid crystal display device in which a polymer layer for improving properties is formed on a horizontal alignment film formed by a photo-alignment treatment.

BACKGROUND ART

A liquid crystal display (LCD) device is a display device that controls the alignment of birefringent liquid crystal molecules to control the transmission/shielding of light (on/off of display). Examples of display modes of LCD include a vertical alignment (VA) mode in which liquid crystal molecules having negative anisotropy of dielectric constant are aligned vertically to a substrate surface; an in-plane switching (IPS) mode and a fringe field switching (FES) mode, in which liquid crystal molecules having positive or negative anisotropy of dielectric constant are aligned horizontally to a substrate surface to apply a horizontal electric field to a liquid crystal layer.

Among these, in a multi-domain vertical alignment (MVA) mode in which liquid crystal molecules having negative anisotropy of dielectric constant are used and a rib or a slit of an electrode is provided as an alignment regulating structure, a liquid crystal alignment direction during voltage application can be controlled in plural directions without subjecting an alignment film to a rubbing treatment, and thus viewing angle characteristics are superior. However, in an MVA-LCD of the related art, an upper side of a rib or an upper side of a slit is the boundary of alignment division of liquid crystal molecules, the transmittance during white display is low, dark lines are observed in the display, and thus there is room for improvement.

In contrast, as a method for obtaining a high-luminance and high-speed response LCD, alignment stabilization techniques using a polymer (hereinafter, also referred to as "polymer sustained (PS) technique") have been suggested (for example, refer to Patent Literatures 1 to 8). Among these, in pre-tilt angle imparting techniques using a polymer (hereinafter, also referred to as "polymer sustained alignment (PSA) technique"), polymerizable components such as polymerizable monomers and oligomers are mixed to obtain a liquid crystal composition; the liquid crystal composition is sealed between substrates; and the monomers are polymerized to form a polymer in a state where liquid crystal molecules are tilted by applying a voltage between the substrates. As a result, the liquid crystal molecules have a certain pre-tilt angle even after the voltage application is stopped, and thus the alignment direction of the liquid crystal molecules can be regulated to be uniform. The monomers are selected from materials which are polymerizable by heat, light (ultraviolet rays), or the like. In addition, the liquid crystal composition may contain a polymerization initiator for initiating the polymerization of monomers (for example, refer to Patent Literature 4).

Examples of other liquid crystal display elements using a polymerizable monomer include polymer dispersed liquid crystal (PDLC) and polymer network liquid crystal (PNLC) (for example, refer to Patent Literature 9). These elements include a polymer which is formed by adding a polymerizable monomer to liquid crystal and irradiating the mixture with ultraviolet rays or the like; and perform light scattering switching by using the matching and non-matching of refractive indices between the liquid crystal and the polymer. In addition, examples of the other liquid crystal display elements include polymer-stabilized ferroelectrics liquid crystal (FLC) phase (for example, refer to Patent Literature 10), and polymer-stabilized optically compensated bend (OCB) (for example, refer to Non Patent Literature 1).

Meanwhile, in recent years, as a technique for obtaining superior viewing angle characteristics, a photo-alignment technique is investigated in which the liquid crystal alignment direction during voltage application can be controlled in plural directions without subjecting an alignment film to a rubbing treatment and thus superior viewing angle characteristics can be obtained. The photo-alignment technique is a technique in which a photoactive material is used to form an alignment film; and the formed film is irradiated with light rays such as ultraviolet rays to impart an alignment regulating force to the alignment film (for example, refer to Patent Literature 11).

Furthermore, recently, when the photo-alignment technique is used in combination with the polymer stabilization techniques using a polymer, a research on a method of suppressing hysteresis has been disclosed (for example, refer to Non Patent Literatures 2 and 3). Non Patent Literatures 2 and 3 disclose a configuration of adjusting the concentration of a monomer which is mixed with liquid crystal in an IPS mode cell in which one substrate is subjected to a rubbing treatment and the other substrate is subjected to a photo-alignment treatment.

CITATION LIST

Patent Literature

Patent Literature 1: Japanese Patent No. 4175826
Patent Literature 2: Japanese Patent No. 4237977
Patent Literature 3: JP-A 2005-181582
Patent Literature 4: JP-A 2004-286984
Patent Literature 5: JP-A 2009-102639
Patent Literature 6: JP-A 2009-132718
Patent Literature 7: JP-A 2010-33093
Patent Literature 8: U.S. Pat. No. 6,177,972
Patent Literature 9: JP-A 2004-70185
Patent Literature 10: JP-A 2007-92000
Patent Literature 11: WO 2006/043485

Non Patent Literature

Non Patent Literature 1: H. Kikuchi, et al., Nature Materials, 1, pp. 64 to 68, 2002
Non-Patent Literature 2: Nagatake et al., Proceedings of The Japanese Liquid Crystal Society Annual Meetings 2010, "Reduction of EO Hysteresis of Photo-Aligned IPS-LCDs with Polymer Stabilized Method", 2010. 9
Non Patent Literature 3: Y. Nagatake, et al., ITE and SID, "Hysteresis Reduction in EO Characteristic of Photo-Aligned IPS-LCDs with Polymer-Surface-Stabilized Method", IDW'10, 89-92, LCT p. 2-5, 2010. 12

SUMMARY OF INVENTION

Technical Problem

However, when a horizontal alignment film is formed by a photo-alignment treatment, it was found that a large number of small bright spots are generated in a display screen at the time of black display and display defect occurs, unlike the case of forming a vertical alignment film by a conventional photo-alignment treatment. These bright spots are based on generation of a large number of small disclinations (liquid crystal alignment defects). The present inventors made investigations and found that the bright spots were not generated in the display of a mode such as the VA mode employing a vertical alignment film, but generated peculiarly in the display of a mode such as the IPS mode or the FFS mode employing a horizontal alignment film.

The present invention has been made in consideration of such circumstances, and an object thereof is to provide a method for manufacturing a liquid crystal display device, which hardly causes alignment defects in the case of forming a horizontal alignment film by employing a photo-alignment treatment.

Solution to Problem

As a result of investigations on a cause of generation of disclinations, the present inventors found that the disclinations were easy to be generated in the vicinity of protrusions and recesses existing in a liquid crystal display panel, for example, in the surroundings of a columnar spacer, a hole formed in an insulating film for electric communication of a pixel electrode to an under layer, and wiring having a taper shape.

Further, when the present inventors made various investigations on means for preventing generation of the disclinations, they focused on the point that ultraviolet ray irradiation for a photo-alignment treatment was generally carried out to a substrate surface from the normal direction in conventional cases, and found that it was difficult to carry out even light irradiation to an uneven surface if the irradiation was from the normal direction with respect to a substrate surface as described above. Then, the present inventors made investigations on a method for irradiation to a substrate surface from a slanting direction, and it was made clear that the disclinations near protrusion and recess parts were considerably reduced by irradiating the same site two or more times from slanting directions mutually different at 90° or greater.

The reason why the problem is solved by irradiation from slanting directions a plurality times is as follows. FIG. 1 to FIG. 4 are views schematically illustrating a state of irradiating a surface including protrusions and recesses with ultraviolet rays. FIG. 3 and FIG. 4 illustrate a state of irradiation to a substrate surface from the normal direction one time (conventional example), and FIG. 1 and FIG. 2 illustrate a state of irradiation to a substrate surface from slanting directions a plurality of times (present invention).

As illustrated in FIG. 3, there is a columnar protrusion 12 having a smooth surface on a substrate 11 (for example, corresponding to spacers) and when the surface of the substrate 11 was irradiated with light from the normal direction in a situation where a film 14 containing a photo-alignment film material is applied on these structures, the light irradiation may be the same as the light irradiation to the surface of the film 14 on the protrusion 12 from a slanting direction. The photo-alignment is a function generated based on the photochemical reaction of a material constituting the film 14, so that the difference of the light irradiation intensity leads to the difference of advancement of the reaction. That is, in this case, a plurality of regions where light irradiation amount differs slightly are formed on the surface of the film 14 on the protrusion 12, and in a region where the photochemical reaction is insufficient, an effect such as insufficiency of alignment regulating force for photo-alignment or the like may be caused. On the other hand, as illustrated in FIG. 4, similarly in a case where there is a insulating film 13 whose surface is recessed toward the inside on the substrate 11 (for example, corresponding to a contact part of TFT formed in an insulating film), a plurality of regions where light irradiation amount differs slightly are formed on the surface of the film 14 on the recessed part, and in a region where the photochemical reaction is insufficient, an effect such as insufficiency of alignment regulating force for photo-alignment or the like may be caused.

On the other hand, as illustrated in FIG. 1, in a case where irradiation is carried out to the surface of the substrate 11 from slanting and respectively different directions a plurality of times, such unevenness is not generated. For example, as illustrated in FIG. 1, in a case where there is a columnar protrusion 12 having a smooth surface on the substrate 11, one protrusion 12 is irradiated with light slantingly from both sides, and thus the light irradiation amount in each irradiation region is equalized for any regions. This can be also the same in a case, as illustrated in FIG. 2, where there is an insulating film 13 whose surface is recessed toward the inside on the substrate 11. Further, there is no disadvantage for such an irradiation method even in a case where irradiation is carried out for a region with planer surface. It is because when irradiation is carried out a plurality of times, the alignment regulating force is generated based on the total of the respective irradiation amount, and the light irradiation amount in the respective irradiation regions is equalized for any regions. As is understood from the foregoing explanation, in the case of V-shape exposure; that is, when at least two lights irradiated slantingly differ 180° in direction and the incident angle is the same as each other, the exposure becomes equivalent to the front surface exposure, and thus the effect is exerted to the maximum.

An advantage of employing such an irradiation method also includes as follows. FIG. 5 is a conceptual diagram illustrating the relation between the polarization direction of applied light and the direction of the alignment regulating force applied to liquid crystal when a compound including a cinnamate group is used as a photo-alignment film material and light for exposure is polarized light. Single-headed arrows (1) to (3) in FIG. 5 indicate exposure directions, and the respective double-headed arrows indicate respective polarization directions. The double-headed arrow containing a cinnamate group indicates a cinnamate group reacted by the polarization light, that is, a carbon-carbon double bond part (—C=C—) of a part of the cinnamate group contained in the alignment film material, and the directions of the transition moments (a) to (d).

As illustrated in FIG. 5(1), when polarized light having electric vector to the in-plane direction (right and left direction) from the front direction is applied, reaction is most easily advanced in (a) among (a) to (d). By the irradiation of (1), reaction is advanced to some extent in (b) and (c). The direction of the alignment regulating force generated by the light irradiation and applied to liquid crystal is perpendicular to the double-headed arrow direction (a). Regarding the cinnamate group in the direction (d), reaction is hardly caused by the irradiation of (1).

In contrast, as illustrated in FIGS. 5(2) and (3), when polarized light is applied from direction slantingly at an angle from the front direction, reaction is advanced sufficiently in the directions (b) and (c) and reaction is also advanced in the directions (a) and (d). That is, such an exposure method from slanting directions is particularly effective for a compound including a linear photoreactive functional group such as a cinnamate group. As a result, the number of reactions of a functional group is increased to give excellent reactivity.

Further, it is necessary to take reflection of light into consideration in the case of irradiation from a slanting direction, but if the irradiation light is P polarized light, reflectance is low as compared to that in the case of other polarized light, and the entering degree in the alignment film is increased, and thus the reaction of the photo-alignment film is more promoted in the case of slanting irradiation with P polarized light.

Consequently, the present inventors have arrived at being capable of splendidly soling the above-mentioned problems, and have completed the present invention.

That is, according to one aspect of the present invention, there is provided a method for manufacturing a liquid crystal display device including a step of forming a horizontal alignment film by carrying out a photo-alignment treatment of irradiating a photo-alignment film material applied to at least one substrate of a pair of substrates with light, wherein the photo-alignment treatment is a treatment for irradiating the same region with light two or more times from a slanting direction with respect to a surface of the at least one substrate of the pair of substrates, and at least two of lights applied two or more times in the photo-alignment treatment are polarized lights applied from directions mutually different at 90° or greater.

The configuration of the method for manufacturing a liquid crystal display device is not especially limited by other components as long as it essentially includes such components. Hereinafter, the method for manufacturing a liquid crystal display device and preferable methods thereof will be described in detail. In addition, methods performed by combining two or more of preferable methods as the method for manufacturing a liquid crystal display device described below are also included as a preferable method for manufacturing a liquid crystal display device.

The method for manufacturing a liquid crystal display device includes a step of forming a horizontal alignment film by carrying out a photo-alignment treatment of irradiating a photo-alignment film material applied to at least one substrate of a pair of substrates with light. Preferably the photo-alignment treatment is carried out on both substrates of the pair of substrates. The photo-alignment film is a polymer film which has the properties of obtaining anisotropy and an alignment regulating force to liquid crystal when being irradiated with polarized light or non-polarized light. In the present invention, as light to be used for the photo-alignment treatment, polarized light is used. A material activated by light irradiation is used as the photo-alignment film material.

It is preferable that the photo-alignment material contain at least one chemical structure selected from a group consisting of terphenyl derivatives, naphthalene derivatives, phenanthrene derivatives, tetracene derivatives, spiropyran derivatives, spiroperimidine derivatives, viologen derivatives, diarylethene derivatives, anthraquinone derivatives, azobenzene derivatives, cinnamoyl derivatives, chalcone derivatives, cinnamate derivatives, coumarin derivatives, stilbene derivatives, and anthracene derivatives. A benzene ring contained in these derivatives may be a heterocyclic ring. Herein, "derivatives" means compounds substituted with a specified atom or functional group; and compounds in which a monovalent or divalent or higher functional group is incorporated into a molecular structure. These derivatives may be present in a molecular structure of a main chain of a polymer or in a molecular structure of a side chain of a polymer; and may be a monomer or an oligomer. When a monomer or oligomer including such a photoactive functional group (preferably, 3% by weight or greater) is contained in the photo-alignment film material, a polymer constituting the photo-alignment film may be photoinactive. In terms of heat resistance, the polymer constituting the photo-alignment film is preferably polysiloxane, polyamide acid, or polyimide.

The photo-alignment film material may be a polymer alone or a mixture containing additional molecules together with a polymer as long as it has the above-described properties. For example, a low-molecular-weight compound such as an additive or a photoinactive polymer may further be added to a polymer including a photoalignable functional group. For example, an additive including a photoalignable functional group may be added to a photoinactive polymer. The photo-alignment film material is selected from materials which cause photodissociation, photoisomerization or photodimerization. Normally, as compared to photodissociation, photoisomerization and photodimerization can perform alignment with light with a longer wavelength and a smaller irradiation amount and thus are superior in mass production.

That is, it is preferable that the material forming the photo-alignment film include a compound containing either or both of a photoisomerizable functional group and a photodimerizable functional group. Representative examples of the materials which cause photoisomerization and photodimerization include azobenzene derivatives, cinnamoyl derivatives, chalcone derivatives, cinnamate derivatives, coumarin derivatives, diarylethene derivatives, stilbene derivatives, and anthracene derivatives. Representative examples of the materials which cause photodissociation include materials containing a cyclobutane skeleton. A benzene ring contained in these photoreactive functional groups may be a heterocyclic ring.

Particularly, the photo-alignment film material is preferable to include a compound containing at least one functional group selected from a group consisting of an azo group, a chalcone group, a stilbene group, a coumarin group, and a cinnamate group, and is particularly excellent in reactivity at the time of carrying out the photo-alignment treatment according to the present invention. Above all, a cinnamate group has high reactivity.

The alignment film formed by carrying out the step of irradiating the photo-alignment film material with light is a horizontal alignment film. The horizontal alignment film refers to a film which aligns liquid crystal molecules adjacent to the horizontal alignment film substantially horizontally to a surface of the horizontal alignment film. The alignment regulating force by the horizontal alignment film is determined mainly by the kinds of the photo-alignment film material (photofunctional group), and the alignment direction of liquid crystal molecules, the degree of a pre-tilt angle and the like can be adjusted by the kind of light, the irradiation time of light, the irradiation intensity of light, the kind of a photofunctional group, and the like. Examples of a liquid crystal display device produced by the method for manufacturing a liquid crystal display device include the IPS mode, the FFS mode, the OCB mode, a twisted nematic (TN) mode, a super twisted nematic (STN) mode, the FLC mode, an anti-Ferroelectric (AFLC) mode, the PDLC mode, and a polymer network liquid crystal (PNLC) mode. Among these, the IPS mode, the FFS mode, the FLC mode, or the AFLC mode is preferable because the desired alignment can be achieved by one step of polarized light irradiation from the front surface of a substrate, and thus the process is simple and mass productivity is superior.

In the alignment mode, in order to improve viewing angle characteristics, it is preferable that at least one substrate of the pair of substrates includes a multidomain structure. The multidomain structure refers to a structure in which there are plural regions including different alignment forms (for example, bend directions in the OCB mode or twist directions in the TN and STN mode) or different alignment directions of liquid crystal molecules during either or both voltage application and non-voltage application. In order to obtain a multidomain structure, it is necessary that either or both processes including a process of actively patterning an electrode into an appropriate form; and a process of irradiating a photoactive material with light using a photo mask or the like be performed.

The photo-alignment treatment is a treatment of irradiating, in the same region, a surface of the at least one substrate of the pair of substrates with light two or more times from a slanting direction, and at least two of lights applied two or more times in the photo-alignment treatment are polarized lights applied from directions mutually different at 90° or greater. As described above, such irradiation can effectively prevent generation of alignment defects (disclinations) of liquid crystal molecules from occurring in the vicinity of protrusions and recesses existing in a liquid crystal display panel (for example, in the surroundings of a columnar spacer, a hole formed in an insulating film for electric communication of a pixel electrode to an under layer, and wiring having a taper shape). Further, according to the method, there is no disadvantage for such an irradiation method even in a case where irradiation is carried out for a region with planer surface. The expression "applied from directions mutually different" means at least two lights are applied from directions mutually different at 90° or greater among three lights in a case where irradiation is carried out three or more times.

It is preferable that the at least two of lights applied two or more times be applied from directions mutually different at 150 to 210°, and more preferably different at 180°. As a result, alignment properties more excellent in evenness can be given to both of regions including protrusions and recesses and regions including no protrusions or recesses.

An error of an incident angle of the at least two of the lights applied two or more times is preferably within 45°. As a result, the error of the alignment regulating force generated by each light irradiation can be lessened, and a horizontal alignment film having even alignment properties can be obtained.

Particularly, in a case where V-shape exposure of combination thereof is used; that is, in a case where at least two of the lights applied in the photo-alignment treatment are applied from directions mutually different at 180° and the error of incident angle of the at least two of the lights applied is within 10°, well-balanced alignment properties more excellent in evenness can be given to both of regions including protrusions and recesses and regions including no protrusions or recesses. The V-shape exposure also has an advantage such that the apparatus structure of an exposure apparatus can be simplified.

At least one of the lights applied two or more times is preferable to have an incident angle of 10° to 60°. It is more preferable that any of the lights applied in the step of forming a horizontal alignment film has an incident angle of 10° to 60°.

At least one of the lights applied two or more times is preferable to be P polarized light. It is more preferable that any of the lights applied in the photo-alignment treatment is P polarized light. It is necessary to take reflection of light into consideration in the case of irradiation to the substrate surface from a slanting direction, but if the irradiation light is P polarized light, reflectance is low as compared to that in the case of other polarized light, and the entering degree in the alignment film is increased, and thus the reaction of the photo-alignment film is promoted in the case of slanting irradiation.

The method for manufacturing a liquid crystal display device is preferable to include a step of forming a polymer layer for controlling alignment of liquid crystal molecules adjacent thereto on the horizontal alignment film by irradiating a liquid crystal composition containing a liquid crystal material and a monomer and being injected between the pair of substrates with light to polymerize the monomer. Hereinafter, the reason for this will be described in detail.

The current photo-alignment technique is usually introduced for mass-production of TVs using a vertical alignment film for the VA mode and the like; and has not yet been introduced for mass-production of TVs using a horizontal alignment film for the IPS mode and the like. The reason is that, when a horizontal alignment film is used, image sticking occurs to a large degree in liquid crystal display. Image sticking is the phenomenon in which, when the same amount of voltage is continuously applied to a part of liquid crystal cell for a certain time and then the entire display is changed to another one, luminance appears to be different between portions to which a voltage is continuously applied and portions to which a voltage is not applied.

FIG. 6 is a diagram schematically illustrating a state of image sticking in a liquid crystal cell of an IPS mode which is manufactured by performing a photo-alignment treatment. As illustrated in FIG. 6, there is a large difference in luminance between a voltage (AC) application portion and a voltage (AC) non-application portion, and it is found that image sticking occurs to an extremely large degree in the voltage (AC) application portion.

Therefore, in order to prepare a liquid crystal cell of the IPS mode obtained by using a photo-alignment treatment, the present inventors investigated the introduction of a polymer stabilization (PS) process of adding a polymerizable monomer to liquid crystal and polymerizing the polymerizable monomer with heat or light to form a polymer layer on the interface with a liquid crystal layer. FIG. 7 is a diagram schematically illustrating a state of image sticking in a liquid crystal cell of an IPS mode which is manufactured by introducing a photo-alignment treatment and adopting a PS process. As illustrated in FIG. 7, there is no difference in luminance between a voltage (AC) application portion and a voltage (AC) non-application portion, and it is found that image sticking is reduced in the voltage (AC) application portion. As described above, by adding the PS process to a method of the related art, image sticking is significantly reduced.

The present inventors have investigated in various ways the reason why image sticking occurs to a large degree particularly in a liquid crystal cell of the IPS mode, and have found that there is a difference in the mechanism of image sticking between a liquid crystal cell of the IPS mode and a liquid crystal cell of the VA mode. According to the investigations of the present inventors, in the VA mode, image sticking occurs because the tilt in a polar angle direction remains (is memorized); whereas, in the IPS mode, image sticking occurs because the alignment in an azimuth direction remains (is memorized) and an electric double layer is formed. According to the further investigations, it was found that these phenomena are caused by a material used for a photo-alignment film.

In addition, the present inventors have thoroughly investigated and found that the improvement caused by the PS process is particularly effective when an alignment film formed of a photoactive material is used. For example, it was found that, when an alignment film formed of a photoinactive material is subjected to a rubbing treatment or is not subjected any alignment treatment, the improvement caused by the PS process cannot be obtained.

According to the investigation by the present inventors, the reason why the combination of the alignment film formed of a photoactive material with the PS process is preferable is as follows. FIG. 8 is a diagram for comparison schematically illustrating a polymerization state of a polymerizable monomer when an alignment film formed of a photoinactive material is subjected to a PS process, and FIG. 9 is a diagram for comparison schematically illustrating a polymerization state of a polymerizable monomer when an alignment film formed of a photoactive material is subjected to a PS process. As illustrated in FIGS. 8 and 9, in the PS process, a pair of substrates and a liquid crystal composition with which a gap between the pair of substrates is filled are irradiated with light such as ultraviolet rays; the chain polymerization such as radical polymerization of polymerizable monomers 33 and 43 in a liquid crystal layer starts; and a formed polymer is deposited on surfaces of alignment films 32 and 42 on the side of the liquid crystal layer 30 to form a polymer layer (hereinafter, also referred to as "PS layer") for controlling the alignment of liquid crystal molecules.

When the alignment film 42 is photoinactive, as illustrated in FIG. 8, polymerizable monomers 43a in the liquid crystal layer 30 which are excited by light irradiation are uniformly generated in the liquid crystal layer 30. Excited polymerizable monomers 43b are photopolymerized, and polymer layers are formed by phase separation on the interfaces between the alignment film 42 and the liquid crystal layer 30. That is, in the PS process, there is a process in which the polymerizable monomers 43b excited in the bulk are photopolymerized and move to the interfaces between the alignment film 42 and the liquid crystal layer 30.

On the other hand, when the alignment film 32 is photoactive, as illustrated in FIG. 9, a larger amount of polymerizable monomers 33b in the excited state are formed. The reason is that the alignment film 32 absorbs light when being irradiated with light and the excitation energy thereof is transferred to polymerizable monomers 33a. Due to this excitation energy, the polymerizable monomers 33a adjacent to the photo-alignment film 32 are easily changed to the polymerizable monomers 33b in the excited state. That is, the polymerizable monomers 33a in the liquid crystal layer which are excited by light irradiation are concentrated on the vicinity of the interfaces between the alignment film 32 and the liquid crystal layer 30, and a larger amount of the polymerizable monomers 33a are present thereon. Therefore, when the alignment film 32 is photoactive, a process in which the excited polymerizable monomers 33b are photopolymerized and move to the interfaces between the alignment film 32 and the liquid crystal layer 30 is negligible. Therefore, a polymerization rate and a rate of forming a polymer layer are improved, and thus a PS layer having a stable alignment regulating force can be formed.

In addition, as a result of investigation, the present inventors found that the image sticking reduction effect by the PS layer is particularly effective for a horizontal alignment film rather than a vertical alignment film. The reason is considered to be as follows. FIG. 10 is a diagram schematically illustrating a state of a vertical alignment film when polymerizable monomers are polymerized. FIG. 11 is a diagram schematically illustrating a state of a horizontal alignment film when polymerizable monomers are polymerized.

When an alignment film is a vertical alignment film as illustrated in FIG. 10, photoactive groups 52 included in the vertical alignment film are in indirect contact with liquid crystal molecules 54 and polymerizable monomers 53 through hydrophobic groups 55. Therefore, the transfer of the excitation energy from the photoactive groups 52 to the polymerizable monomers 53 is difficult.

On the other hand, when an alignment film is a horizontal alignment film as illustrated in FIG. 11, photoactive groups 62 included in the horizontal alignment film are in direct contact with liquid crystal molecules 64 and polymerizable monomers 63. Therefore, the transfer of the excitation energy from the photoactive groups 62 to the polymerizable monomers 63 is easy. Therefore, a polymerization rate and a rate of forming a polymer layer are improved, and thus a PS layer having a stable alignment regulating force can be formed.

Accordingly, when the PS process is performed in a case where an alignment film is formed of a photoactive material and the alignment film is a horizontal alignment film, the transfer of the excitation energy is significantly improved and image sticking can be reduced to a large degree. Consequently, a liquid crystal display device with lowered image sticking and excellent display characteristics can be obtained.

A polymerizable functional group of the monomer is preferable to be an acrylate group, a methacrylate group, a vinyl group, a vinyloxy group, or an epoxy group. The monomer is preferably a monomer which starts polymerization (photopolymerization) by light irradiation or a monomer which starts polymerization (thermal polymerization) by heating. That is, the polymer layer is preferable to be formed by photopolymerization or to be formed by thermal polymerization. In particular, photopolymerization is preferable because polymerization can be easily initiated at normal temperature. It is preferable that light used for the photopolymerization is either or both of ultraviolet rays and visible light rays.

The type of polymerization for forming the polymer layer is not particularly limited, and examples thereof include "step-growth polymerization" in which bifunctional monomers are polymerized stepwise while forming a new bond; and "chain polymerization" in which monomers are sequentially bonded to active species generated from a small amount of catalyst (for example, an initiator) and are grown in a chain reaction. Examples of the step-growth polymerization include polycondensation and polyaddition. Examples of the chain polymerization include radical polymerization and ionic polymerization (for example, anionic polymerization and cationic polymerization).

The polymer layer can be formed on a horizontal alignment film to stabilize the alignment regulating force of the horizontal alignment film. As a result, image sticking in display is significantly reduced and thus display quality can be significantly improved. In addition, when monomers are polymerized to form a polymer layer in a state where liquid crystal molecules are aligned at a pre-tilt angle by applying a threshold or higher voltage to a liquid crystal layer, the polymer layer are formed to include a structure in which liquid crystal molecules are aligned at a pre-tilt angle.

The monomer is preferable to be rod-like molecules in which an aromatic ring is present in the skeleton and the aromatic ring is linear. In the case of rod-like molecules, a structure similar to that of liquid crystal molecules is formed, and it is advantageous for the monomer to be dissolved easily in liquid crystal. Examples of the monomer including a skeleton to be rod-like molecules include biphenyl-based monomers, naphthalene-based monomers, phenanthrene-based monomers, and anthracene-based monomers. A part or all of hydrogen atoms included in the monomer may be substituted with a halogen atom, an alkyl group, or an alkoxy group. A part or all of hydrogen atoms included in the alkyl, or alkoxy group may be substituted with a halogen atom.

The monomer is preferable to be a monomer having function of a polymerization initiator to be polymerized by light irradiation. If an un-reacted monomer and a substance easy to bear electric charge like a polymerization initiator remain in the liquid crystal layer, ionic impurities are generated due to the effect of a back light unit in a common use state after completion or the effect of aging process for inspection after assembly, and it may probably result in image sticking or display unevenness in liquid crystal display. If a monomer having function of a polymerization initiator is used, since the monomer having function of a polymerization initiator itself becomes a component for forming the polymer layer, the monomer does not remain in the liquid crystal layer as an impurity after completion of polymerization reaction. Examples of a monomer that can be the monomer having function of a polymerization initiator include those including, as a polymerizable functional group, a methacryloyloxy group, an acryloyloxy group, a vinyloxy group, an acryloylamino group, or a methacryloylamino group. These polymerizable functional groups spontaneously generate radicals by ultraviolet rays (light with a wavelength within a range from 300 to 380 nm), and thus can start polymerization even without a polymerization initiator. A part or all of hydrogen atoms included in the polymerizable functional group may be substituted with a halogen atom, an alkyl group, or an alkoxy group. A part or all of hydrogen atoms included in the alkyl, or alkoxy group may be substituted with a halogen atom.

Further, when the size of the polymer produced in the PS process is too large, a polymer network structure including huge molecules may be formed not in the alignment film surface but in the entire liquid crystal layer, and as a result, the immobilization of liquid crystal alignment as bulk may be caused and actual application voltage to liquid crystal may be lowered, and it may result in shift of a V-T characteristic to high voltage side. If the concentration of a polymerization initiator is made high, the number of starting points of polymerization can be increased, and thus the size of the polymer produced by light irradiation can be made small, but as described above, remaining of the polymerization initiator in liquid crystal may possibly lead to a problem of image sticking or the like.

On the other hand, the monomer having function of a polymerization initiator can improves the density of the reaction starting points without using a polymerization initiator, and oligomer-like substances in which the polymer size is small are easily formed immediately after light irradiation, and the number of their production can be increased. The oligomer-like substances thus produced are quickly deposited, as a polymer layer, on an alignment film surface based on the precipitation effect due to a solubility decrease in the liquid crystal layer.

As the monomer having function of a polymerization initiator, an acrylate monomer, a diacrylate monomer, and the like having no photopolymerization initiation function may be used in combination, and this can adjust the photopolymerization rate. The adjustment of the photopolymerization rate can be one of effective means in the case of suppressing polymer network production.

The monomer is preferable to be a monomer which starts polymerization by irradiation with visible light. Unlike ultraviolet rays, visible light can decrease damages on the liquid crystal layer and the alignment film. Examples of such a monomer include benzyl-based monomers, benzoin ether-based monomers, acetophenone-based monomers, benzyl ketal-based monomers, and ketone-based monomers, which generate radicals by photocleavage or hydrogen removal. These monomers include a polymerizable functional group, and examples thereof include a methacryloyloxy group, an acryloyloxy group, a vinyloxy group, an acryloylamino group, and a methacryloylamino group. That is, the monomer is preferable to cause photocleavage reaction or hydrogen removal reaction by irradiation with ultraviolet rays or visible light.

The electrode is preferably a transparent electrode. As an electrode material in the present invention, all of light shielding materials such as aluminum and translucent materials such as indium tin oxide (ITO) and indium zinc oxide (IZO) can be used, and for example, when one of the pair of substrates includes a color filter, it is necessary that the irradiation with ultraviolet rays for polymerizing the monomer be performed on the other substrate not including a color filter, and in such as case, if the electrode included in the other substrate has a light shielding property, it results in inefficiency of the polymerization of the monomer.

The liquid crystal material preferably includes liquid crystal molecules containing, in a molecular structure thereof, a multiple bond other than conjugated double bonds of a benzene ring. This is because the multiple bond of liquid crystal molecules themselves can be activated by light, and the liquid crystal material can function as a carrier for transferring the activation energy, radicals, and the like. That is, when liquid crystal is photoactive or functions as a carrier for transferring radicals and the like, a polymerization rate of polymerizable monomers and a rate of forming a PS layer are improved and thus a stable PS layer is formed.

The liquid crystal molecules may have either positive anisotropy of dielectric constant (positive type) or negative anisotropy of dielectric constant (negative type). It is preferable that the liquid crystal molecules be nematic liquid crystal molecules having a high symmetric property in the liquid crystal layer. Examples of a skeleton of the liquid crystal molecules include a structure in which two ring structures and groups bonded to the ring structures are linearly bonded to each other. The multiple bond does not contain conjugated double bonds of a benzene ring. This is because the benzene ring has low reactivity. The liquid crystal molecule may include conjugated double bonds of a benzene ring, that is, the conjugated double bonds be not excluded from it; as long as it essentially has a multiple bond other than conjugated double bonds of a benzene ring. In addition, the liquid crystal molecules may be a mixture of plural kinds thereof. In order to secure the reliability, to improve the response speed, and to adjust the liquid crystal phase temperature range, the elastic constant, the anisotropy of dielectric constant, and the refractive index anisotropy, a liquid crystal material may be a mixture of plural kinds of liquid crystal molecules.

It is preferable that the multiple bond be a double bond, and it is more preferable that the double bond be contained in an ester group or an alkenyl group. As the multiple bond, a double bond has higher reactivity than that of a triple bond. The multiple bond may be a triple bond. In this case, it is preferable that the triple bond be contained in a cyano group. Furthermore, it is preferable that the liquid crystal molecules contain two or more kinds of multiple bonds.

Advantageous Effects of Invention

According to the present invention, there can be provided a liquid crystal display device with few alignment defects since a PS layer for controlling the alignment property of liquid crystal molecules is stably formed even if there are a plurality of protrusions and recesses in the interface with a liquid crystal layer.

DESCRIPTION OF EMBODIMENTS

Figure 1:
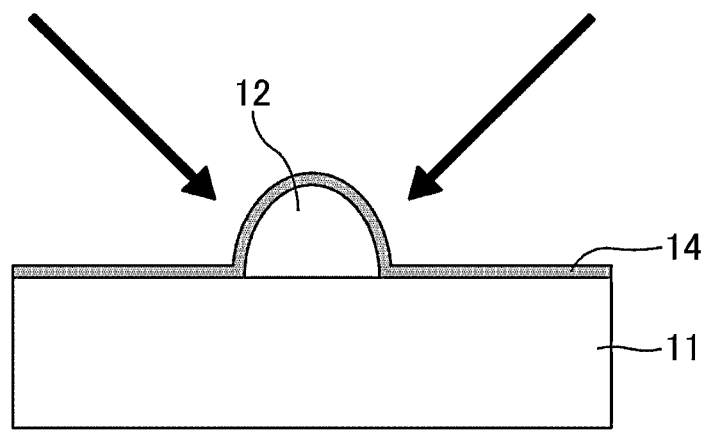
FIG. 1 is a view schematically illustrating a state of irradiating a surface including protrusions and recesses with ultraviolet rays and illustrating a state of irradiation to a substrate surface from slanting directions a plurality of times (present invention).
Figure 2:
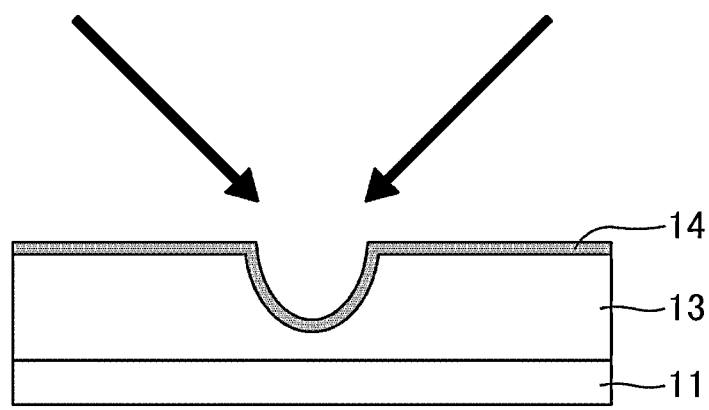
FIG. 2 is a view schematically illustrating a state of irradiating a surface including protrusions and recesses with ultraviolet rays and illustrating a state of irradiation to a substrate surface from slanting directions a plurality of times (present invention).
Figure 3:
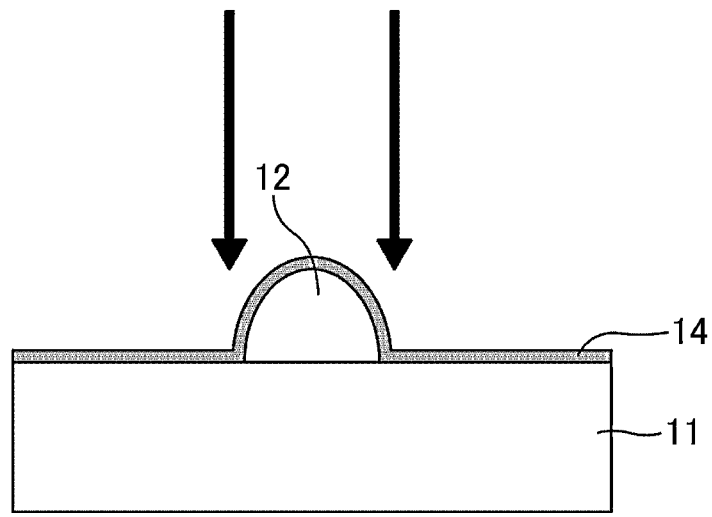
FIG. 3 is a view schematically illustrating a state of irradiating a surface including protrusions and recesses with ultraviolet rays and illustrating a state of irradiation to a substrate surface from the normal direction one time (conventional example).
Figure 4:
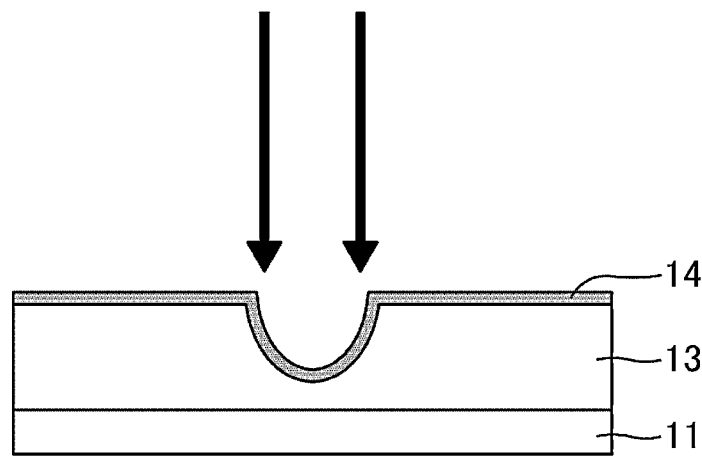
FIG. 4 is a view schematically illustrating a state of irradiating a surface including protrusions and recesses with ultraviolet rays and illustrating a state of irradiation to a substrate surface from the normal direction one time (conventional example).
Figure 5:
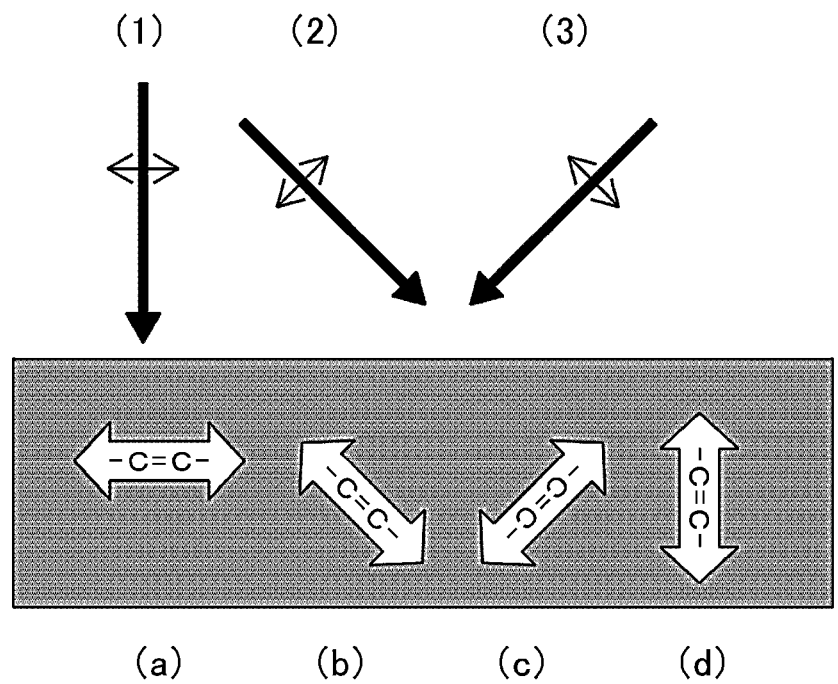
FIG. 5 is a conceptual diagram illustrating the relation between the polarization direction of applied light and the direction of the alignment regulating force applied to liquid crystal when a compound including a cinnamate group is used as a photo-alignment film material and light for exposure is polarized light.
Figure 6:
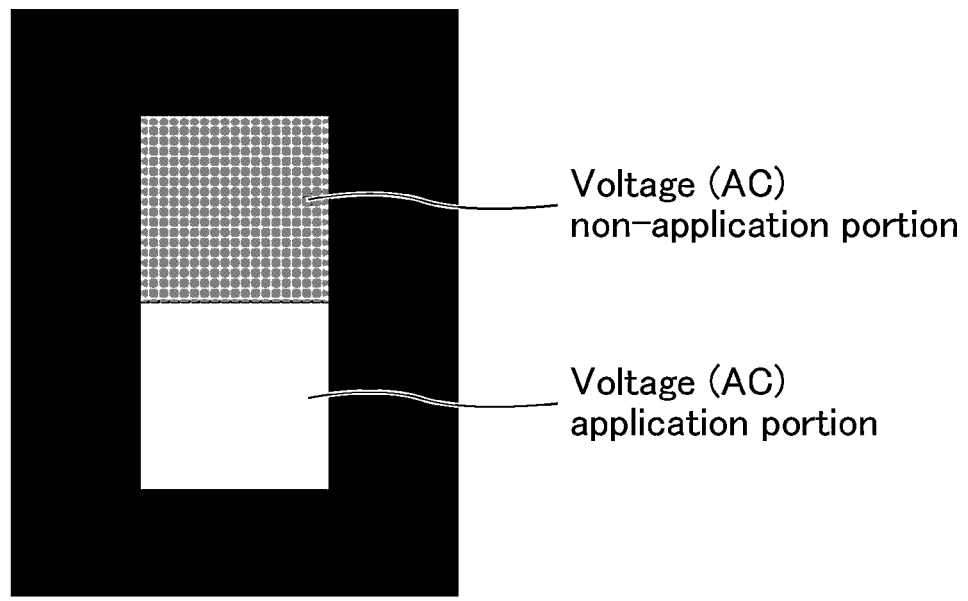
FIG. 6 is a diagram schematically illustrating a state of image sticking in a liquid crystal cell of an IPS mode which is manufactured by performing a photo-alignment treatment.
Figure 7:
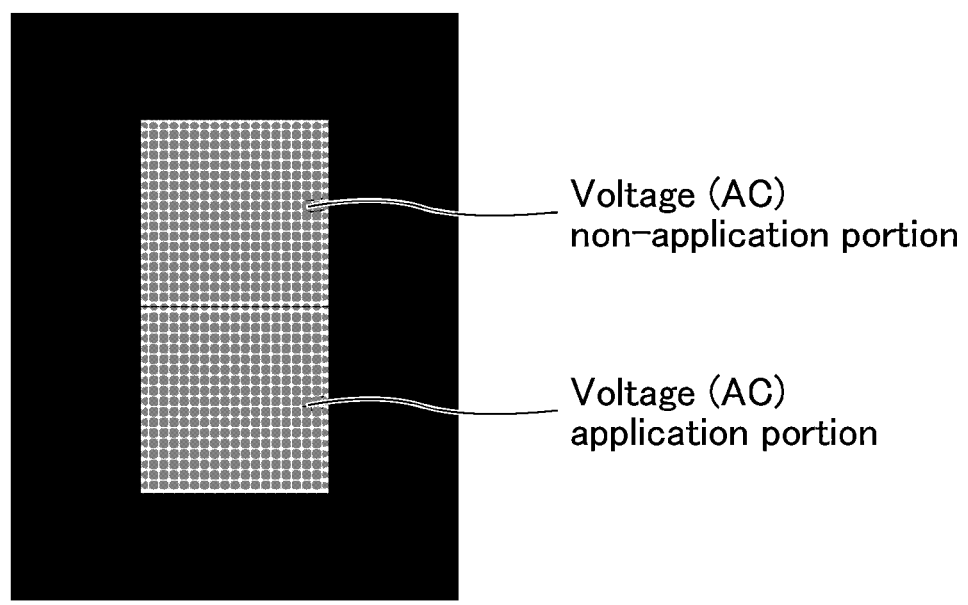
FIG. 7 is a diagram schematically illustrating a state of image sticking in a liquid crystal cell of an IPS mode which is manufactured by introducing a photo-alignment treatment and adopting a PS process.
Figure 8:
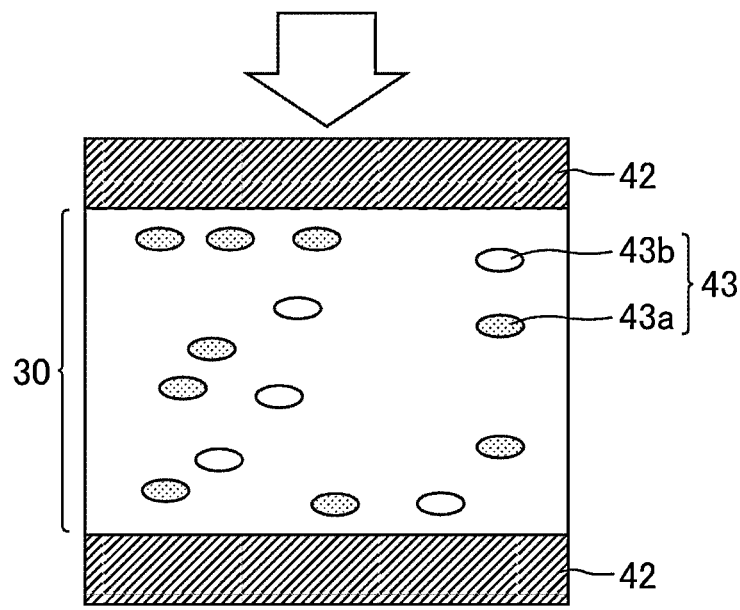
FIG. 8 is a diagram for comparison schematically illustrating a polymerization state of a polymerizable monomer when an alignment film formed of a photoinactive material is subjected to a PS process.
Figure 9:
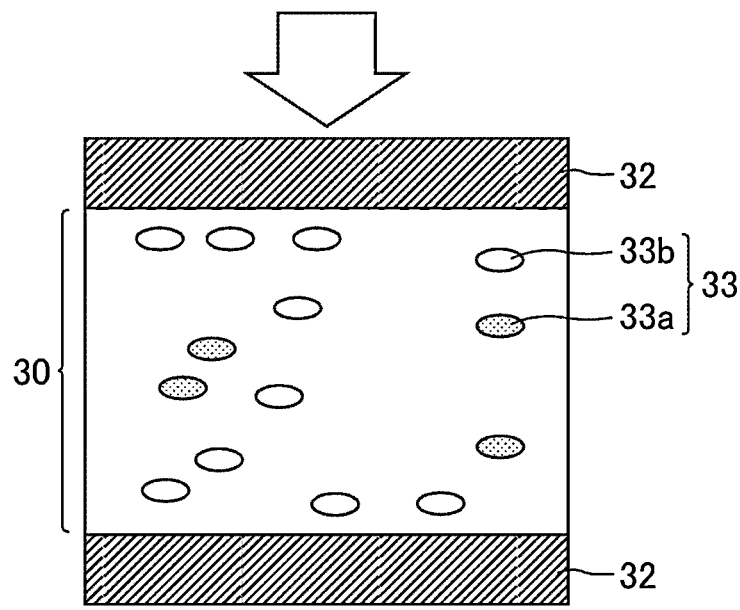
FIG. 9 is a diagram for comparison schematically illustrating a polymerization state of a polymerizable monomer when an alignment film formed of a photoactive material is subjected to a PS process.
Figure 10:
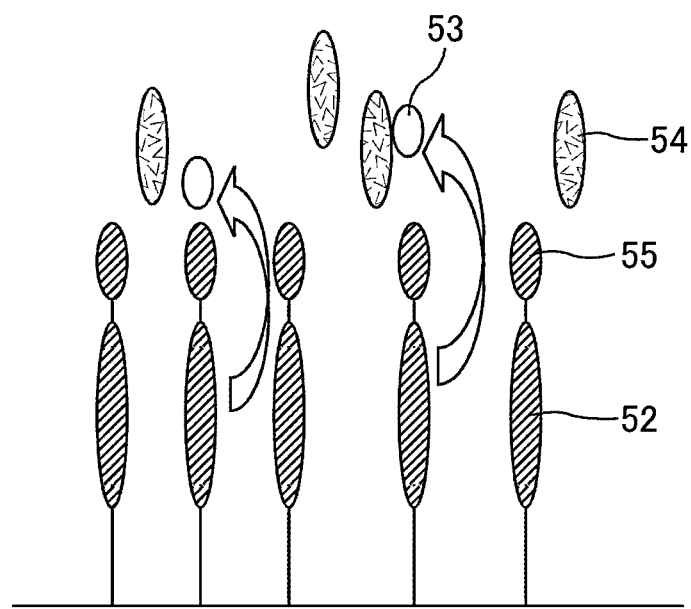
FIG. 10 is a diagram schematically illustrating a state of a vertical alignment film when polymerizable monomers are polymerized.
Figure 11:
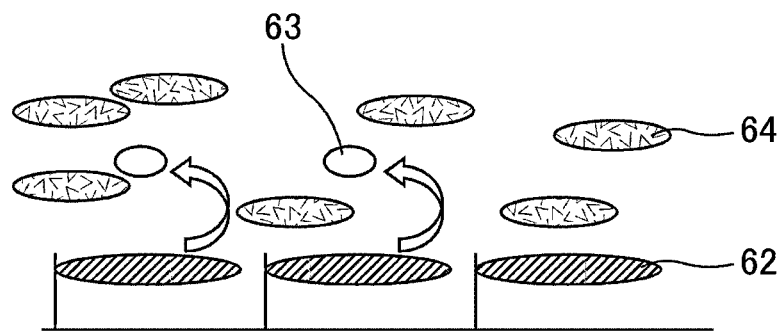
FIG. 11 is a diagram schematically illustrating a state of a horizontal alignment film when polymerizable monomers are polymerized.

The present invention will be mentioned in more detail referring to the drawings in the following embodiments, but is not limited to these embodiments.

Embodiment 1

Hereinafter, a method for manufacturing a liquid crystal display device according to Embodiment 1 will be described in detail. A liquid crystal display device manufactured by the method for manufacturing a liquid crystal display device according to Embodiment 1 is suitably used for a TV panel, a digital signage, a medical monitor, an electronic book, a PC monitor, a tablet terminal panel, a portable terminal panel, or the like.

Figure 12:
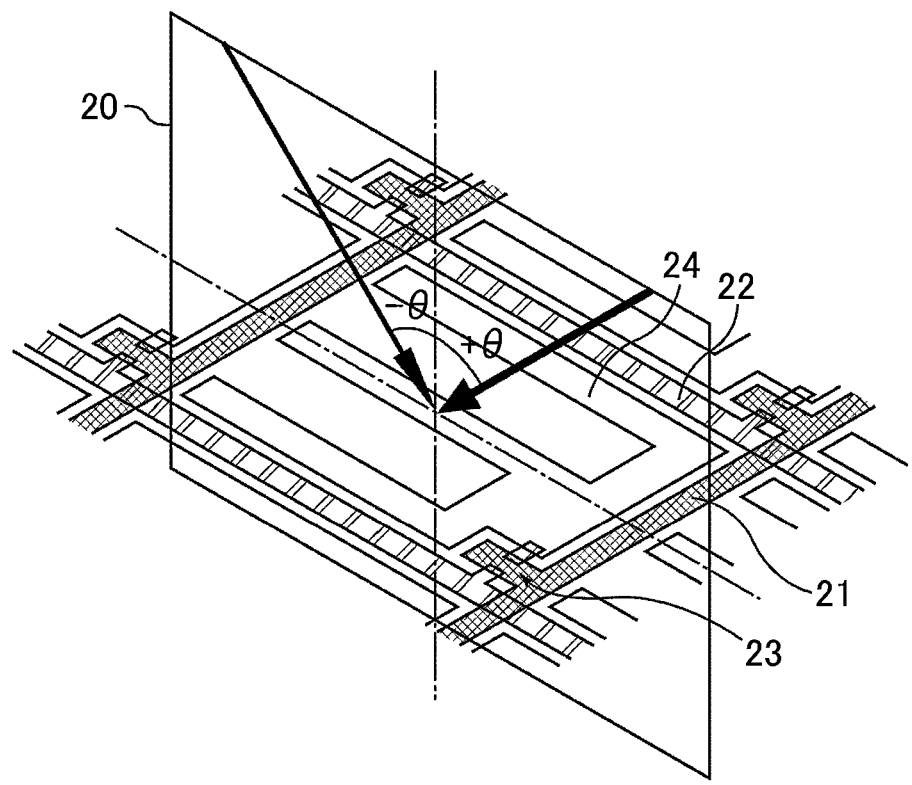
FIG. 12 is a perspective view schematically illustrating a state of carrying out light irradiation to a TFT substrate in Embodiment 1.
Figure 13:
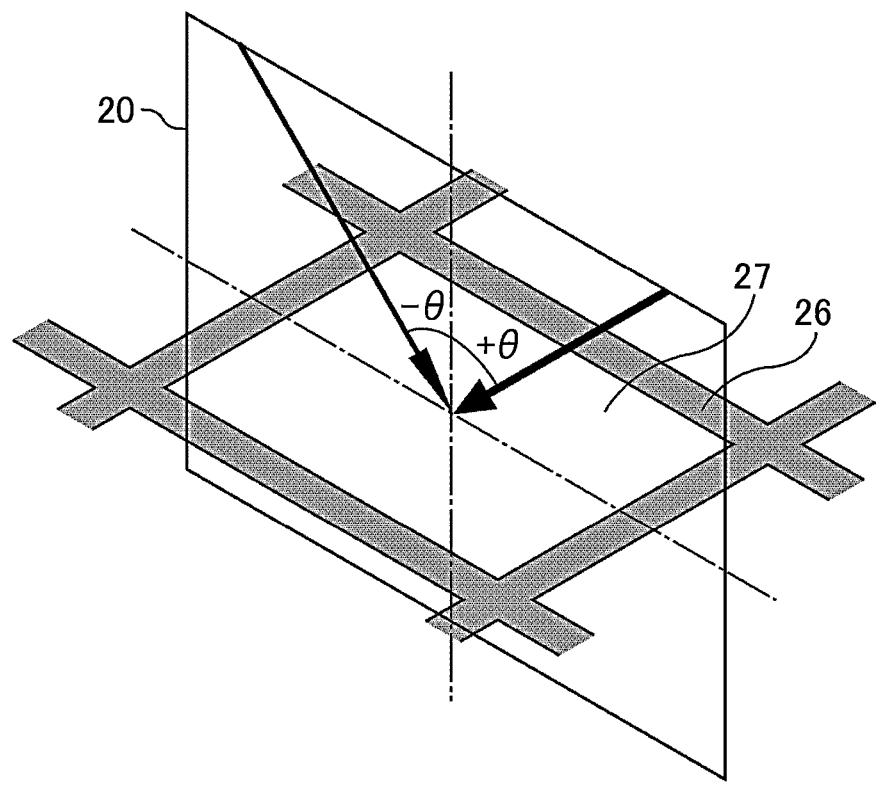
FIG. 13 is a perspective view schematically illustrating a state of carrying out light irradiation to a counter substrate in Embodiment 1.

Before execution of a photo-alignment treatment, first, a pair of substrates, which are a TFT substrate and a counter substrate, to interpose a liquid crystal layer are prepared. FIG. 12 is a perspective view schematically illustrating a state of carrying out light irradiation to a TFT substrate in Embodiment 1. FIG. 13 is a perspective view schematically illustrating a state of carrying out light irradiation to a counter substrate in Embodiment 1.

As illustrated in FIG. 12, for example, a substrate obtained by arranging a scanning signal line 21, a data signal line 22, a TFT 23, and a pixel electrode 24 on a glass substrate through an insulating film is used as a TFT substrate. The scanning signal line 21 and the data signal line 22 are arranged in a manner of crossing each other and connected to the respective electrodes of the TFT (thin film transistor) 23. One of the electrodes of the TFT 23 is further connected to the pixel electrode 24 through a contact hole formed in the insulating film. When scanning signals as pulses supplied at prescribed timing are applied to the TFT 23, data signals supplied at the timing from the data signal line 22 are supplied to the pixel electrode 24. A plurality of the pixel electrodes 24 are arranged in a matrix state. A CS wiring for compensating the pixel potential may be arranged through the insulating film in a manner of transversely crossing the pixel electrode 24. In the case of the IPS mode or the FFS mode, the pixel electrodes form a comb electrode as illustrated in FIG. 12, but it may have other shapes in the case of other modes. For example, the contact hole formed in the insulating film is a cause of forming a recess on the surface of the TFT substrate, and various wirings such as the scanning signal line 21 and the data signal line 22 and tapered forms of various electrodes included in the TFT 23 are causes of forming protrusions and recesses on the surface of the TFT substrate.

As illustrated in FIG. 13, for example, a substrate obtained by arranging a BM (black matrix) 26 and a color filter 27 on a glass substrate is used as a counter substrate. The BM 26 is formed in a lattice-like state so as to be superimposed with the scanning signal line 21 and the data signal line 22 on the TFT substrate, and the color filter 27 is formed in the regions divided by the BM 26. The BM 26 and the color filter 27 are causes of forming protrusions and recesses on the surface of the counter substrate.

Although not illustrated in FIG. 12 and FIG. 13, a common electrode is formed in the TFT substrate and/or the counter substrate besides the pixel electrode. The common electrode is a comb electrode in the case of the IPS mode and a plane electrode in the case of the FFS mode. A columnar spacer is arranged on any one of the TFT substrate and the counter substrate before bonding these substrates to each other, and this columnar spacer is also a cause of forming a protrusion structure on the substrate surface.

Next, a solution containing a photo-alignment film material is applied to the surface of each substrate by a spin cast method or the like, and thereafter, the applied solution is baked at, for example, 180° C. for 60 minutes to form a horizontal alignment film. Examples of the photo-alignment film material include resins containing a photosensitive group. More specifically, preferred is a polymer such as polyimide, polyamic acid, polymaleimide, polyvinyl, and polysiloxane, including a photosensitive group such as an azobenzene group including an azo group (—N═N—) (the following chemical formula (1)), a stilbene group (the following chemical formula (2)), a 4-chalcone group (the following chemical formula (3)), a 4'-chalcone group (the following chemical formula (4)), a coumarin group (the following chemical formula (5)), a cinnamoyl group (the following chemical formula (6)), or a cinnamate group (the following chemical formula (7)). The photosensitive groups represented by the following chemical formulae (1) to (7) are those which cause crosslinking reaction (including dimerization), isomerization, photorealignment, or the like by irradiation with light (preferably ultraviolet rays), and these groups can effectively narrow the dispersion of the pre-tilt angle in a plane of an alignment film as compared to a photodissociation type photo-alignment film material. Additionally, the photosensitive groups represented by following chemical formulae (1) to (7) include structures formed by bonding a substituent group to a benzene ring. Further, the cinnamate group (the following chemical formula (7)) obtained by further bonding an oxygen atom to the carbonyl group of the cinnamoyl group represented by the following chemical formula (6) has particularly high reactivity and can be horizontally aligned with low irradiation energy. Preferable examples of the substituent group for a benzene ring are a fluorine atom, an alkyl group, an alkoxy group, a benzyl group, a phenoxy group, a benzoyl group, a benzoate group, a benzoyloxy group or their derivatives, and this makes it possible to improve electric characteristics and alignment stability. In the case of low irradiation energy, it is advantageous in terms of suppression of deterioration advancement of other members such as color filter. Therefore, a compound containing a cinnamate group is more preferable as the photo-alignment film material. The baking temperature and baking time for forming an alignment film, and the thickness of a photo-alignment film are not particularly limited, and may be set properly.

[Chem. 1]

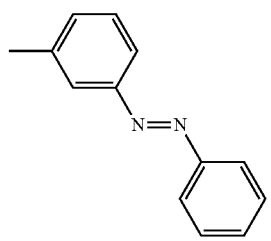

(1)

[Chem. 2]

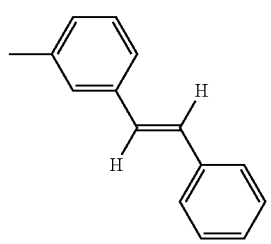

(2)

[Chem. 3]

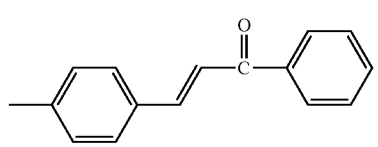

(3)

[Chem. 4]

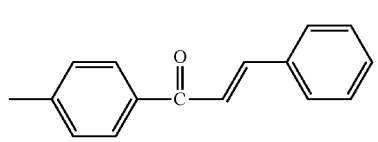

(4)

[Chem. 5]

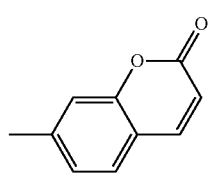

(5)

[Chem. 6]

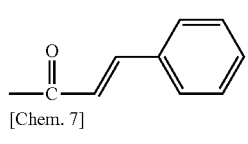

(6)

[Chem. 7]

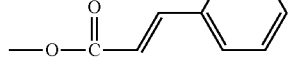

(7)

Next, an exposure method for an alignment film will be described. First, as illustrated in FIG. 12, in one substrate (TFT substrate), an incident surface parallel to the lengthwise direction of the data signal line 22 is assumed in each pixel region, and polarized ultraviolet rays are applied from a slanting direction at +θ° to the normal direction with respect to the substrate surface (first exposure). Subsequently, polarized ultraviolet rays are applied to the region where the first exposure is carried out from a slanting direction at −θ° to the normal direction with respect to the substrate surface (second exposure). Regarding the irradiation directions of the polarized ultraviolet rays, when the optical axes of polarized ultraviolet rays to be applied are projected respectively to the substrate surface, the directions of the projected optical axes are all parallel to the extension direction of the data signal line 22 and have mutually different directions at 180°. That is, the exposure carried out to the TFT substrate in Embodiment 1 is V-shaped exposure. As a result, even if any protrusion and recess surface is irradiated with light or even if a plane surface is irradiated with light, the light exposure amount is equal and the alignment regulating force is equalized in any regions. The polarized ultraviolet rays are preferable to be ultraviolet rays containing a P polarized light component more than an S polarized component, and more preferably P polarized light. As a result, components reflected by the substrate surface can be suppressed and the reactivity by the photo-alignment treatment can be heightened.

Next, as illustrated in FIG. 13, also in the other substrate (counter substrate), an incident surface parallel to the lengthwise direction of the black matrix 26 is assumed in each pixel region, and polarized ultraviolet rays are applied from a slanting direction at +θ° to the normal direction with respect to the substrate surface (first exposure). Subsequently, polarized ultraviolet rays are applied to the region where the first exposure is carried out from a slanting direction at −θ° to the normal direction with respect to the substrate surface (second exposure). Regarding the irradiation directions of the polarized ultraviolet rays, when the optical axes of polarized ultraviolet rays to be applied are projected respectively to the substrate surface, the directions of the projected optical axes are all parallel to the extension direction of the black matrix 26 and have mutually different directions at 180°. That is, the exposure carried out to the counter substrate in Embodiment 1 is V-shaped exposure which is the same as that in the TFT substrate. The polarized ultraviolet rays are preferably P polarized light which is the same as described above.

In Embodiment 1, it can be said in other words that two or more lights applied to the TFT substrate (first exposure and second exposure) respectively constitute an approximately same incident surface 20. Further, it can be said in other words that two or more lights applied to the counter substrate (first exposure and second exposure) respectively constitute the approximately same incident surface 20. It is preferable to bond the TFT substrate and the counter substrate to each other in a manner such that the incident surfaces 20 constituted by two or more lights applied to the TFT substrate and two or more lights applied to the counter substrate are approximately the same. Herein, "approximately the same" includes an error within 5°, preferably within 1°. That is, it is preferable that at least two of lights applied two or more times are applied from directions mutually different at 180°±5°, and it is more preferable that the at least two of lights applied are applied from directions mutually different at 180°±1°. The incident angle of light applied to the TFT substrate and the counter substrate is preferably 10° to 60°.

Figure 14:
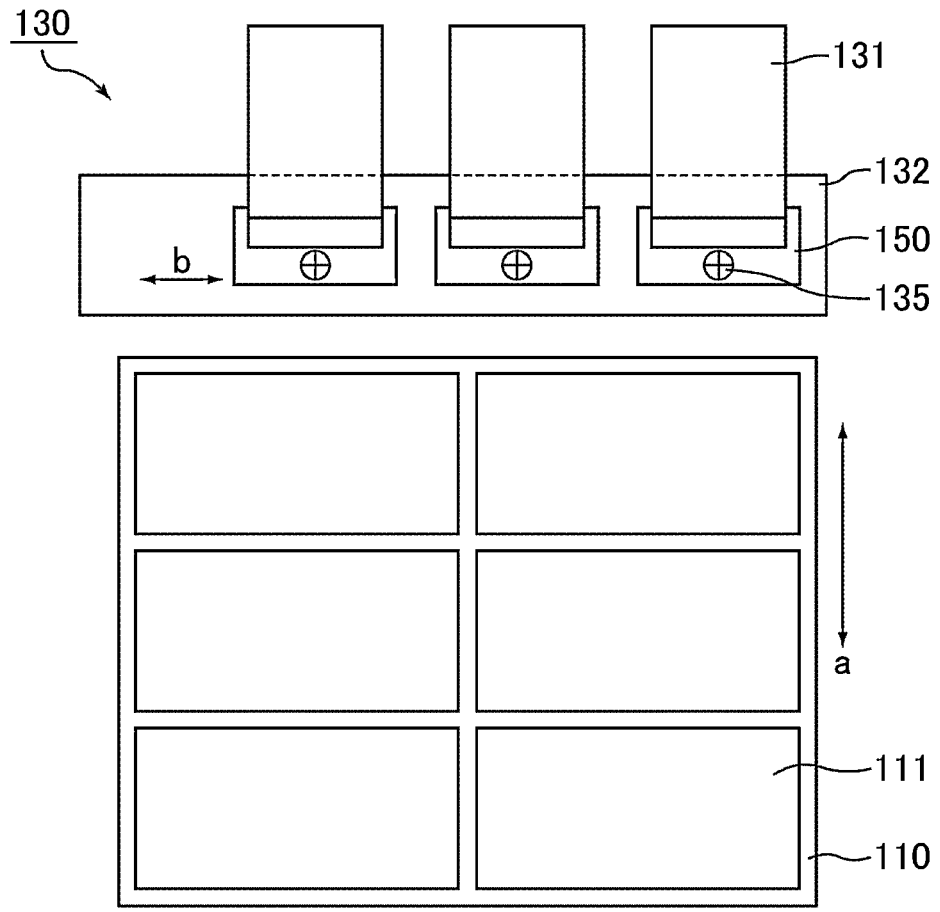
FIG. 14 is a plane view schematically illustrating an exposure apparatus employed in Embodiment 1.
Figure 15:
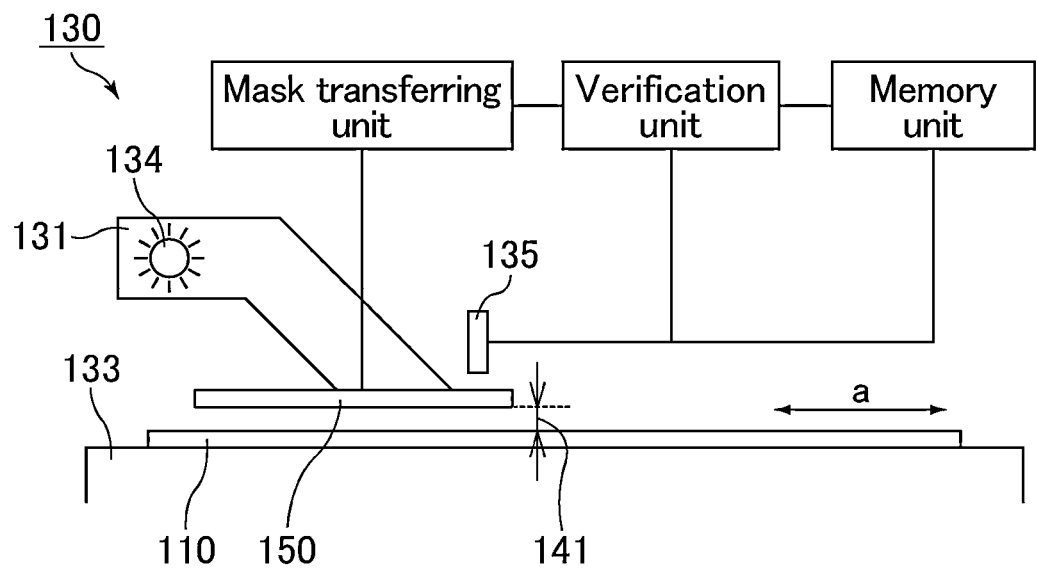
FIG. 15 is a cross-sectional view schematically illustrating an exposure apparatus employed in Embodiment 1.

Next, an exposure apparatus to be used in Embodiment 1 will be described. FIG. 14 is a plane view schematically illustrating an exposure apparatus employed in Embodiment 1. FIG. 15 is a cross-sectional view schematically illustrating an exposure apparatus employed in Embodiment 1.

As illustrated in FIG. 14 and FIG. 15, an exposure apparatus 130 to be used in Embodiment 1 is a one-stage type scanning exposure apparatus and includes an exposure stage 132 including a plurality of exposure heads 131 and a table 133 for placing a substrate (TFT substrate or counter substrate) 110. The table 133 also has a function as a means for transferring the substrate 110. The exposure apparatus 130 may include a means for transferring only the exposure stage 132 or a transfer means for transferring both of the table 133 for placing the substrate 110 and the exposure stage 132. The substrate 110 is a mother glass substrate before being divided into a panel size (the size of the region 111 in the drawing). The surface of the substrate 110 is coated with a photo-alignment film material.

As illustrated in 14, the plurality of exposure heads 131 are arranged at intervals from one another along a direction b perpendicular to a transfer direction (scanning direction) a of the substrate 110. The respective exposure heads 131 are supported in a state of being capable of moving to the direction a or b along a plane parallel to a surface of the substrate 110 to be irradiated.

As illustrated in 15, each of the exposure heads 131 includes a light source 134 for emitting ultraviolet rays, a photo mask 150, and optical members such as a polarization filter and an optical lens installed between the light source 134 and the photo mask 150, and is configured so as to irradiate the surface of the substrate 110 with polarized ultraviolet rays through the photo mask 150 at a prescribed irradiation angle (for example, incident angle of 10° to 60°). The respective optical members can convert ultraviolet rays emitted from the light source to a desired state. The light source 134 may be properly selected depending on an object to be irradiated, and may be a light source emitting visible light.

Each of the exposure heads 131 includes a photographing unit 135, a memory unit, a verification unit, and a mask transferring unit. The photographing unit 135 is for photographing the surface of the substrate 110, and for example, a CCD camera can be employed. In the memory unit, a standard image to be a standard for positioning of exposure is memorized. The verification unit calculates the difference of the position where exposure is carried out actually and the position where exposure should be carried out by verifying the image photographed by the photographing unit 135 and the standard image. The mask transferring unit corrects the position and angle of the photo mask 150 based on the difference calculation result by the verification unit. The verification unit may employ a verification result between the result of the photographed image of the substrate 110 and the result of the photographed image of the photo mask 150 in place of the standard image.

The surface of the photo mask 150 is arranged to be approximately parallel to the surface of the substrate 110 to be irradiated, and a proximity gap 141 is formed between the photo mask 150 and the substrate 110.

Figure 16:
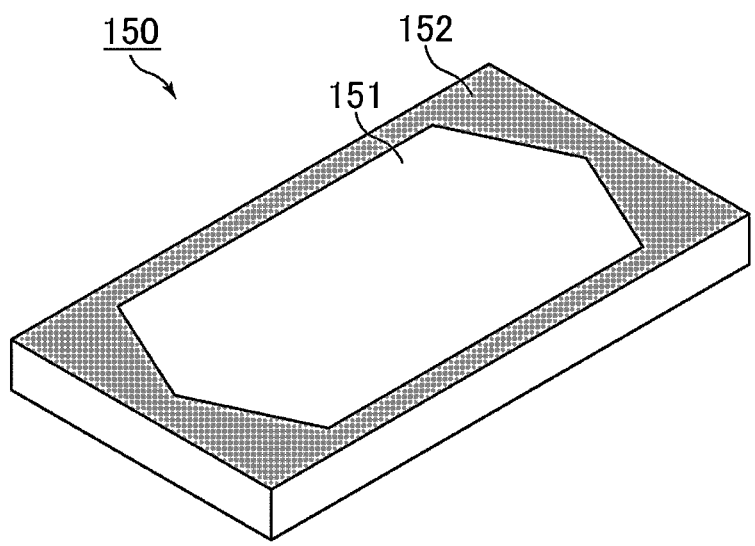
FIG. 16 is a perspective view schematically illustrating a photo mask of an exposure apparatus employed in Embodiment 1.
Figure 17:
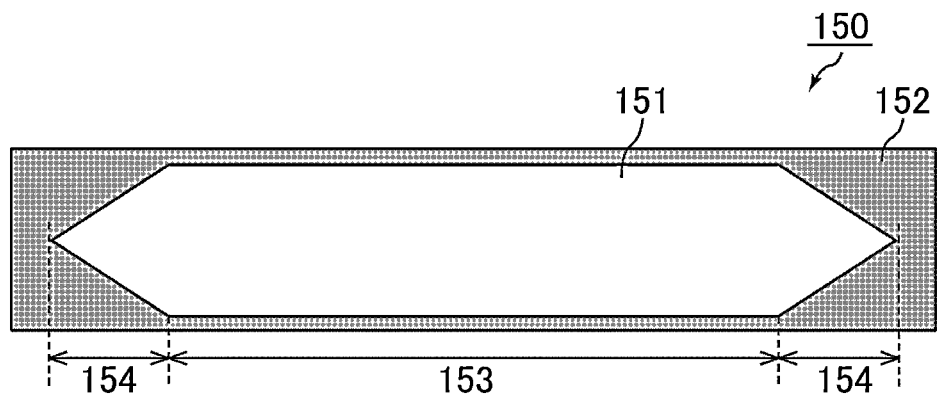
FIG. 17 is a plane view schematically illustrating a photo mask included in an exposure apparatus employed in Embodiment 1.

FIG. 16 is a perspective view schematically illustrating a photo mask of an exposure apparatus employed in Embodiment 1. FIG. 17 is a plane view schematically illustrating a photo mask included in an exposure apparatus employed in Embodiment 1. For example, the photo mask 150 may be a plate-like member which includes, as illustrated in FIG. 16, a transparent substrate made of silica glass or the like and a light shielding member patterned on the transparent substrate. The portion where the light shielding member is positioned becomes a light shielding part 152 and the portion surrounded with the light shielding part 152 becomes a light transmission part 151. The light transmission part 151 has a slit-like shape with tapered both ends. More specifically, as illustrated in FIG. 17, the light transmission part 151 of the photo mask 150 includes a main region 153 and a sub region 154. The width of the main region 153 is even, but the width of the sub region 154 is narrowed as being apart from the main region 153. Accordingly, the amount of light transmitted through the sub region 154 is lower than the amount of light transmitted through the main region 153. The light transmission part 151 is not limited to a member with a light transmission property, and may be an opening penetrating the transparent substrate.

Figure 18:
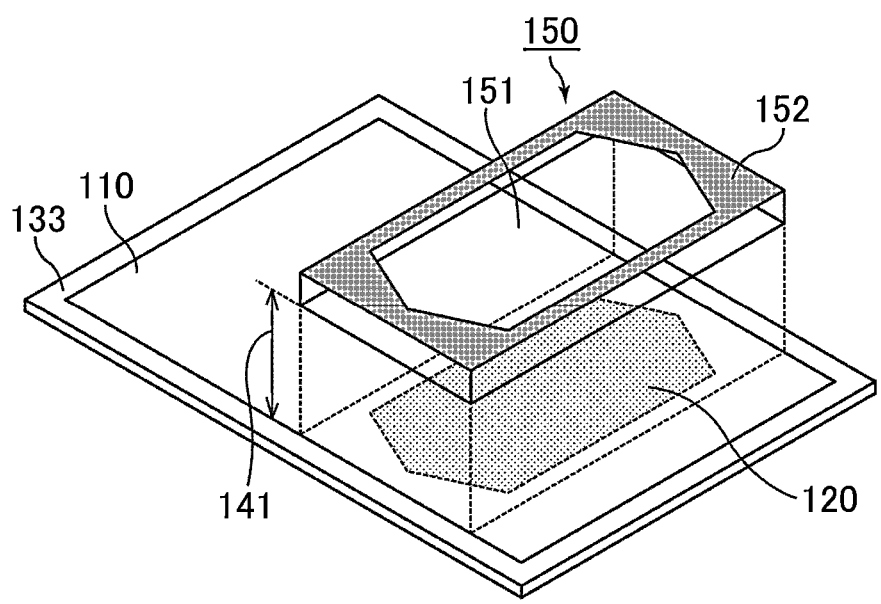
FIG. 18 is a view schematically illustrating a state of carrying out exposure to a substrate surface in Embodiment 1.

FIG. 18 is a view schematically illustrating a state of carrying out exposure to a substrate surface in Embodiment 1. When the substrate 110 passes under the photo mask 150, as illustrated in FIG. 18, a region 120 of the surface of the substrate 110 corresponding to the shape of the light transmission part 151 of the photo mask 150 is exposed to the light.

Figure 19:
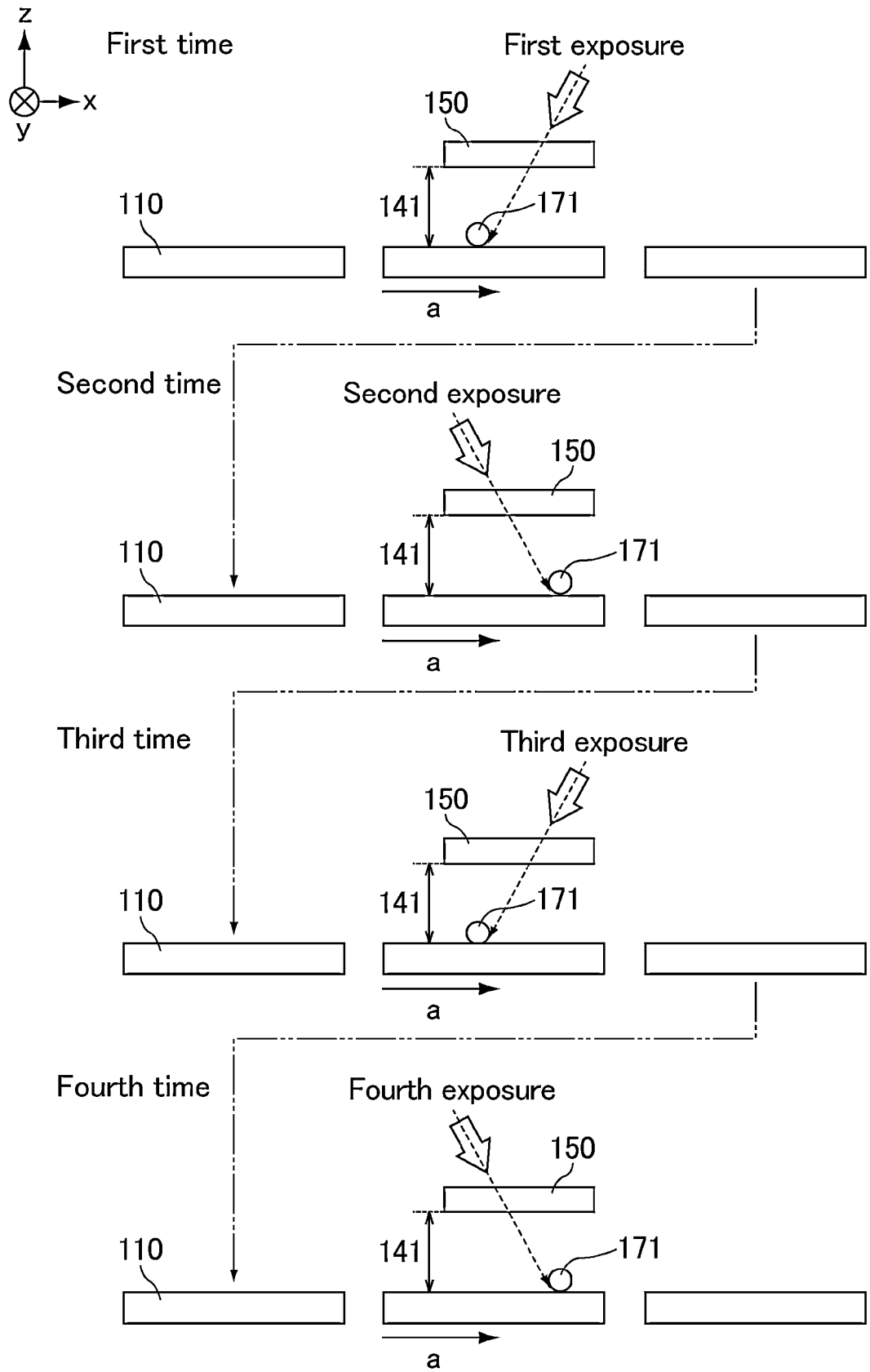
FIG. 19 is a cross-sectional view schematically illustrating a state of carrying out exposure to a TFT substrate surface in Embodiment 1.
Figure 20:
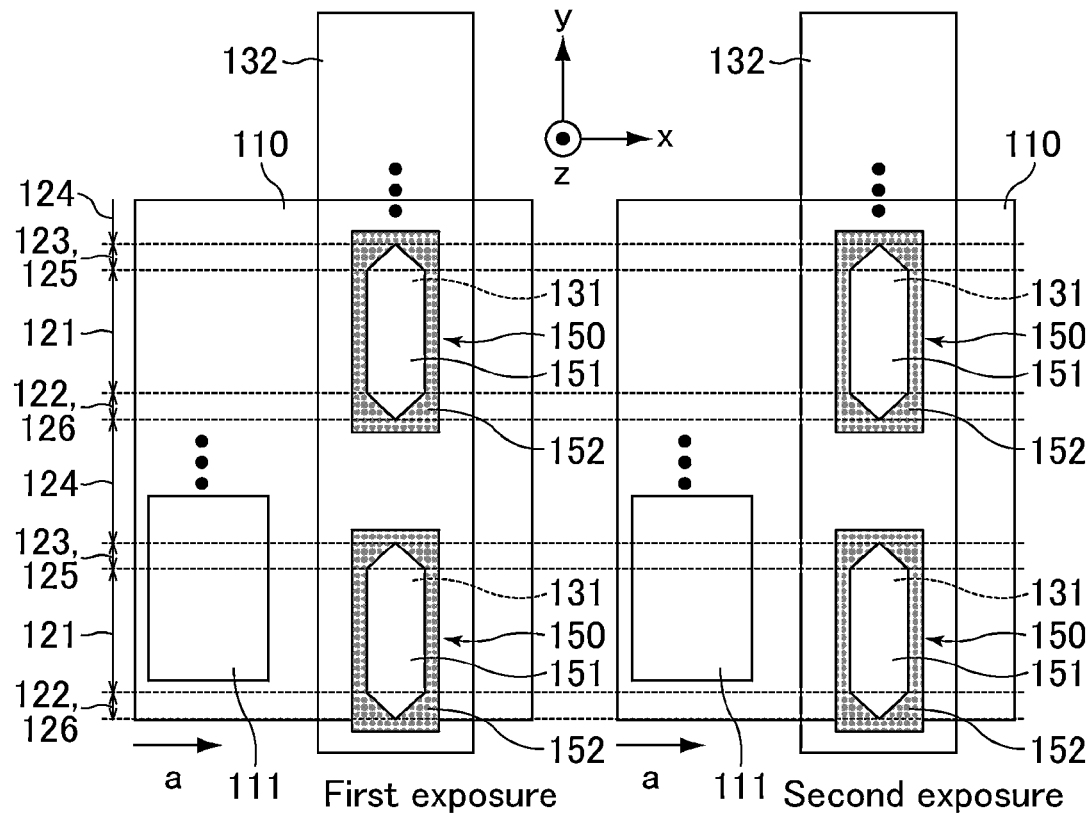
FIG. 20 is a plane view schematically illustrating a state of carrying out exposure to a TFT substrate surface in Embodiment 1.
Figure 20:
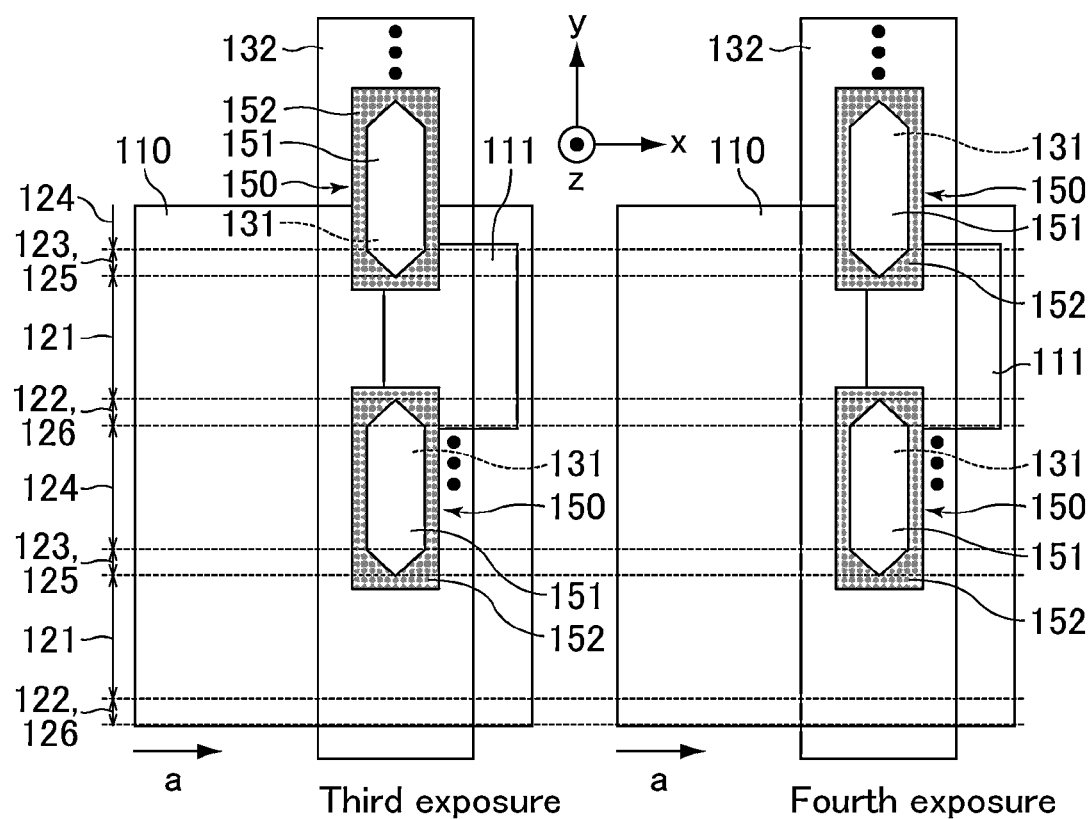

Next, a specific exposure method for the mother glass substrate will be described. In Embodiment 1, a four times exposure method simultaneously using a plurality of photo masks is employed. Herein, the case of executing scanning exposure by transferring a substrate but not photo masks will be described. Additionally, the case of transferring a substrate in a manner such that the lengthwise direction of the data signal line is the same as the scanning direction will be described. FIG. 19 is a cross-sectional view schematically illustrating a state of carrying out exposure to a TFT substrate surface in Embodiment 1. FIG. 20 is a plane view schematically illustrating a state of carrying out exposure to a TFT substrate surface in Embodiment 1. As illustrated in FIG. 20, the shape of the light transmission part 151 of the photo mask 150 to be used for exposure is a slit tapered in both ends. Photo masks are arranged in a manner such that the longitudinal direction of the light transmission part 151 is coincident with the lengthwise direction of the scanning signal line, that is, perpendicular to the lengthwise direction of the data signal line.

As illustrated in FIG. 19 and FIG. 20, polarized ultraviolet rays are applied from one end to the other end of a region of the substrate 110 to which a photo-alignment film material is applied through the photo mask 150 while the substrate 110 is transferred at a constant speed in the +x axis direction (first exposure). As a result of the first exposure, exposure is carried out in a manner such that a first region 121 is exposed through the main region of the light transmission part of the photo mask 150, and a second region 122 and a third region 123 are exposed through the sub region of the light transmission part of the photo mask 150, respectively.

The region through which the sub region of the photo mask 150 passes becomes a joining region overlapped on a portion of the neighboring exposure region. The photo-alignment treatment cannot be completed by one time exposure for a substrate with a large surface area such as a mother glass substrate, and thus it is necessary to carry out exposure separately a plurality of times. In a case where exposure is carried out a plurality of times, a joining region to be a boundary part of respective exposure regions is formed, and this joining region may become a cause of alignment unevenness. Therefore, in Embodiment 1, the boundary in the joining regions can be made vague and occurrence of alignment unevenness can be suppressed by preparing a sub region with a shape tapered toward the terminal, and making the aperture ratio of the sub region smaller than that of the main region.

As illustrated in FIG. 19 and FIG. 20, a photo-alignment film in which liquid crystal molecules adjacent thereto are aligned substantially horizontally to the substrate surface (0° to 2° with respect to the substrate surface) is formed on the surface of the substrate 110 by the first exposure. In FIG. 19, the major axis of the liquid crystal molecules 171 is along the y axis direction.

On completion of the first exposure, the substrate 110 is then transferred to the −x axis direction and turned back to the starting position. Exposure is carried out again with a changed incident angle for the region where the first exposure is executed (second exposure). The incident angle of the light for exposure in the second exposure is reverse in positively and negativity to the incident angle of the light for exposure in the first exposure (that is, light is applied at an incident angle with the same absolute value from a direction different at 180°), and accordingly, V-shaped exposure is carried out. As a result of the second exposure, exposure is carried out in a manner such that the first region 121 is exposed through the main region of the light transmission part 151 of the photo mask 150, and the second region 122 and the third region 123 are exposed through the sub region of the light transmission part 151 of the photo mask 150, respectively.

On completion of the second exposure, the substrate 110 is transferred to the −x axis direction, and turned back to the position in front of the exposure stage 132 (starting point). Then, each exposure head 131 is transferred by the length of one exposure head in the +y axis direction; that is, by the length equal to addition of each one main region and each one sub region of the light transmission part 151 of the photo mask.

As illustrated in FIG. 19 and FIG. 20, polarized ultraviolet rays are applied at the same incident angle as that of the first exposure from one end to the other end of a region of the substrate 110 to which a photo-alignment film material is applied through the photo mask 150 while the substrate 110 is transferred at a constant speed in the +x axis direction (third exposure). At this time, the substrate 110 is transferred to the direction perpendicular to the longitudinal direction of the light transmission part 151 of the photo mask 150. As a result of the third exposure, exposure is carried out in a manner such that a fourth region 124 is exposed through the main region of the light transmission part 151 of the photo mask 150, and a fifth region 125 and a sixth region 126 are exposed through the sub region of the light transmission part 151 of the photo mask 150.

On completion of the third exposure, the substrate 110 is then transferred to the −x axis direction and turned back to the starting position. Thereafter, in the same manner as in the second exposure, exposure is carried out again with a changed incident angle for the region where the third exposure is executed (fourth exposure). The incident angle of the light for exposure in the fourth exposure is reverse in positively and negativity to the incident angle of the light for exposure in the third exposure (that is, light is applied at an incident angle with the same absolute value from a direction different at 180°), and accordingly, V-shaped exposure is carried out.

Figure 21:
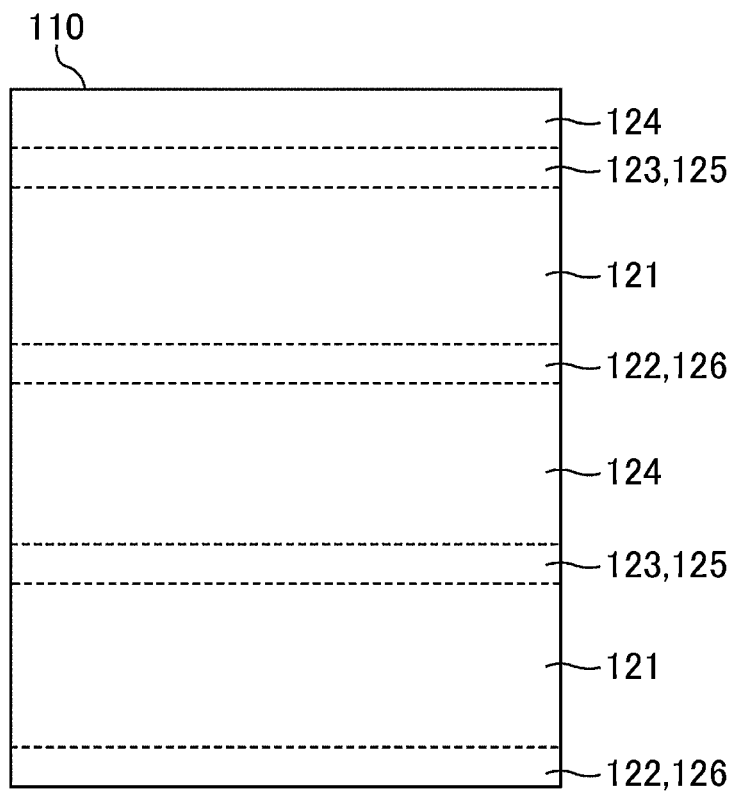
FIG. 21 is a plane view schematically illustrating an exposure region of a substrate after an exposure step in Embodiment 1.

FIG. 21 is a plane view schematically illustrating an exposure region of a substrate after an exposure step in Embodiment 1. According to the exposure method, the substrate 110 is exposed in the entire surface, and the photo-alignment treatment for the substrate 110 is completed. Further, the third region (joining region) 123 exposed through the subregion of the light transmission part of the photo mask in the first exposure and the second exposure and the fifth region (joining region) 125 exposed through the sub region of the light transmission part of the photo mask in the third exposure and the fourth exposure are overlapped and exposed two times, and the second region (joining region) 122 exposed through the sub region of the light transmission part of the photo mask in the first exposure and the second exposure and the sixth region (joining region) 126 exposed through the sub region of the light transmission part of the photo mask in the third exposure and the fourth exposure are overlapped and exposed two times.

Consequently, the light exposure amount in the region irradiated through the sub region of the light transmission part of the photo mask 150 in the first exposure to fourth exposure is almost equal to the light exposure amount in the first region 121 and the fourth region 124 irradiated through the main region of the light transmission part of the photo mask in the first exposure to fourth exposure, and even alignment is obtained, and thus generation of display unevenness in a joining region can be prevented.

In the foregoing description, the substrate 110 is transferred to the −x axis direction after termination of the first exposure and the third exposure, and the exposure heads are turned back to the starting points and the direction of the incident angle is changed to carry out exposure, but instead of that, a method for turning the substrate around at 180° may be employed (modified method of Embodiment 1). Accordingly, without changing the incident angle and turning the exposure heads back to the starting point, the second exposure and the fourth exposure can be started to result in lessening of the number of steps.

The above steps are carried out respectively for the mother glass substrate including TFT substrate configuration and the mother glass substrate including counter substrate configuration to complete the photo-alignment treatment for the respective substrates.

Herein, the case of the exposure apparatus 130 including one exposure stage 132 is described, but the exposure apparatus 130 may include a plurality of stages. For example, four stages in total may be given to the first exposure, the second exposure, the third exposure and the fourth exposure.

Embodiment 2

A manufacturing method of Embodiment 2 is the same as in Embodiment 1, except that the exposure apparatus to be used and the exposure method are different from those in Embodiment 1.

Figure 22:
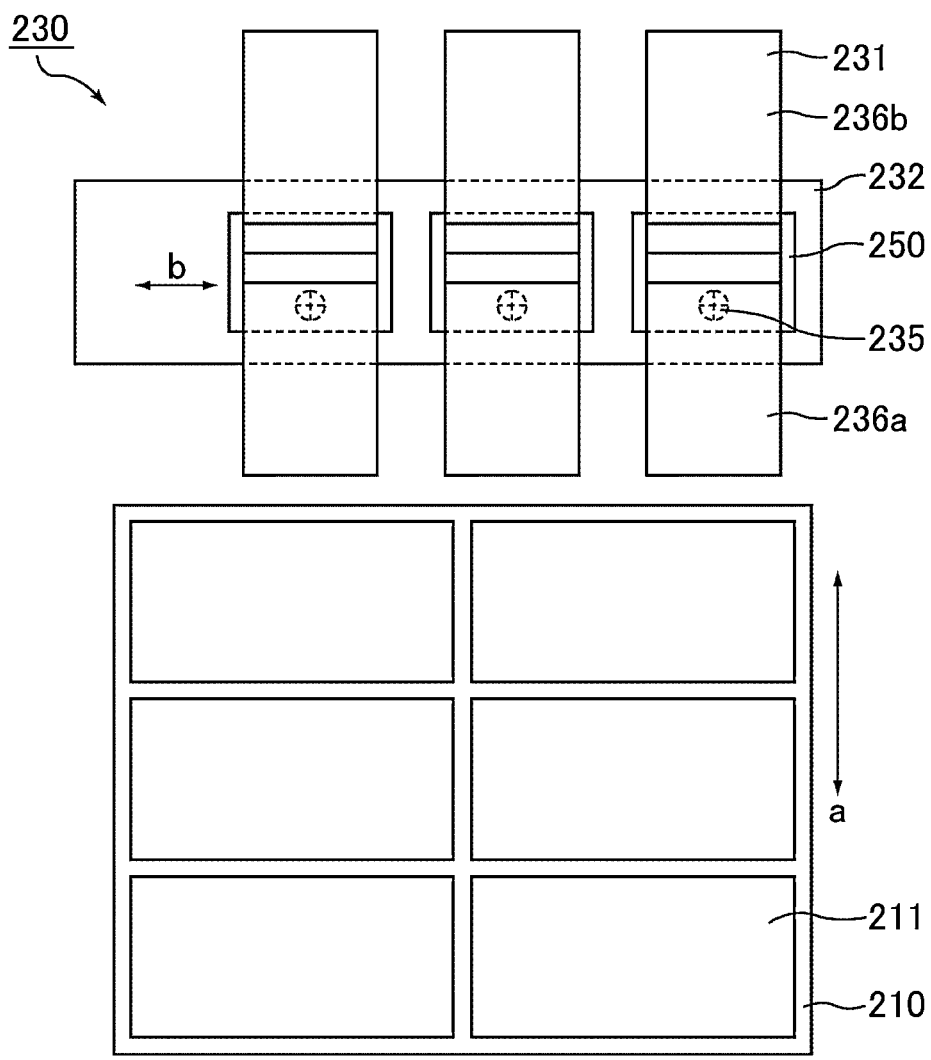
FIG. 22 is a plane view schematically illustrating an exposure apparatus employed in Embodiment 2.
Figure 23:
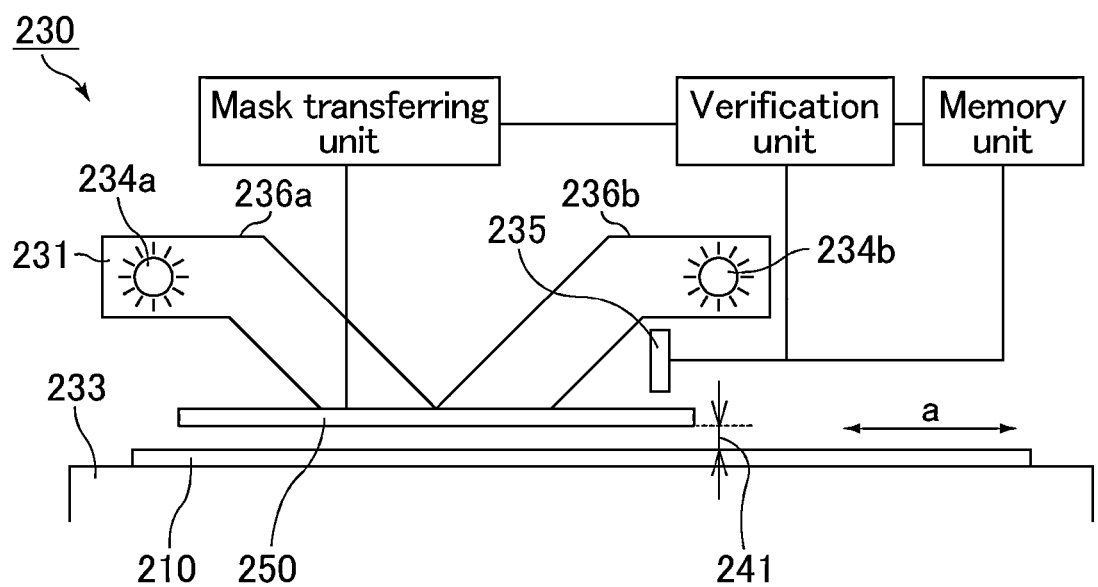
FIG. 23 is a cross-sectional view schematically illustrating an exposure apparatus employed in Embodiment 2.

FIG. 22 is a plane view schematically illustrating an exposure apparatus employed in Embodiment 2. FIG. 23 is a cross-sectional view schematically illustrating an exposure apparatus employed in Embodiment 2.

As illustrated in FIG. 22 and FIG. 23, an exposure apparatus 230 to be used in Embodiment 2 is a one-stage type scanning exposure apparatus and includes an exposure stage 232 including a plurality of exposure heads 231 and a table 233 for placing a substrate (TFT substrate or counter substrate) 210. The table 233 also has a function as a means for transferring a substrate 210. The exposure apparatus 230 may include a means for transferring only the exposure stage 232 or a transfer means for transferring both of the table 233 for placing the substrate 210 and the exposure stage 232. The substrate 210 is a mother glass substrate before being divided into a panel size (the size of the region 211 in the drawing). The surface of the substrate 210 is coated with a photo-alignment film material.

As illustrated in 22, the plurality of exposure heads 231 are arranged at intervals from one another along a direction b perpendicular to a transfer direction (scanning direction) a of the substrate 210. The respective exposure heads 231 are supported in a state of being capable of moving to the direction b along a plane parallel to a surface of the substrate 110 to be irradiated.

As illustrate in FIG. 22 and FIG. 23, each exposure head 231 includes a first exposure unit 236a for first exposure and third exposure, a second exposure unit 236b for second exposure and fourth exposure, and a photo mask 250. The first exposure unit 236a includes a light source 234a for emitting ultraviolet rays, and optical members such as a polarization filter and optical lens installed between the light source 234a and the photo mask 250. The second exposure unit 236b includes a light source 234b for emitting ultraviolet rays, and optical members such as a polarization filter and optical lens installed between the light source 234b and the photo mask 250. The respective optical members can convert ultraviolet rays emitted from the light source to a desired state. Each exposure head 231 is configured so as to irradiate the surface of the substrate 210 at a prescribed irradiation angle (for example, incident angle of 10° to 60°) with polarized ultraviolet rays through the photo mask 250. The light sources 234a and 234b may be properly selected depending on an object to be irradiated and may be a light source for emitting visible light.

Each of the exposure heads 231 includes a photographing unit 235, a memory unit, a verification unit, and a mask transferring unit. The photographing unit 235 is for photographing the surface of the substrate 210, and for example, a CCD camera can be employed. In the memory unit, a standard image to be a standard for positioning of exposure is memorized. The verification unit calculates the difference of the position where exposure is carried out actually and the position where exposure should be carried out by verifying the image photographed by the photographing unit 235 and the standard image. The mask transferring unit corrects the position and angle of the photo mask 250 based on the difference calculation result by the verification unit. The verification unit may employ a verification result between the result of the photographed image of the substrate 210 and the result of the photographed image of the photo mask 250 in place of the standard image.

The surface of the photo mask 250 is arranged to be approximately parallel to the surface of the substrate 210 to be irradiated, and a proximity gap 241 is formed between the photo mask 250 and the substrate 210.

The characteristics of the light transmission part 251 of the photo mask 250 in Embodiment 2 is the same as those in Embodiment 1.

Hereinafter, the exposure apparatus to be used in Embodiment 2 and a specific exposure method for the mother glass substrate will be described. In Embodiment 2, a two times exposure method simultaneously using a plurality of photo masks is employed. Herein, the case of executing scanning exposure by transferring a substrate but not photo masks will be described. Additionally, the case of transferring a substrate in a manner such that the lengthwise direction of the data signal line is the same as the scanning direction will be described.

Figure 24:
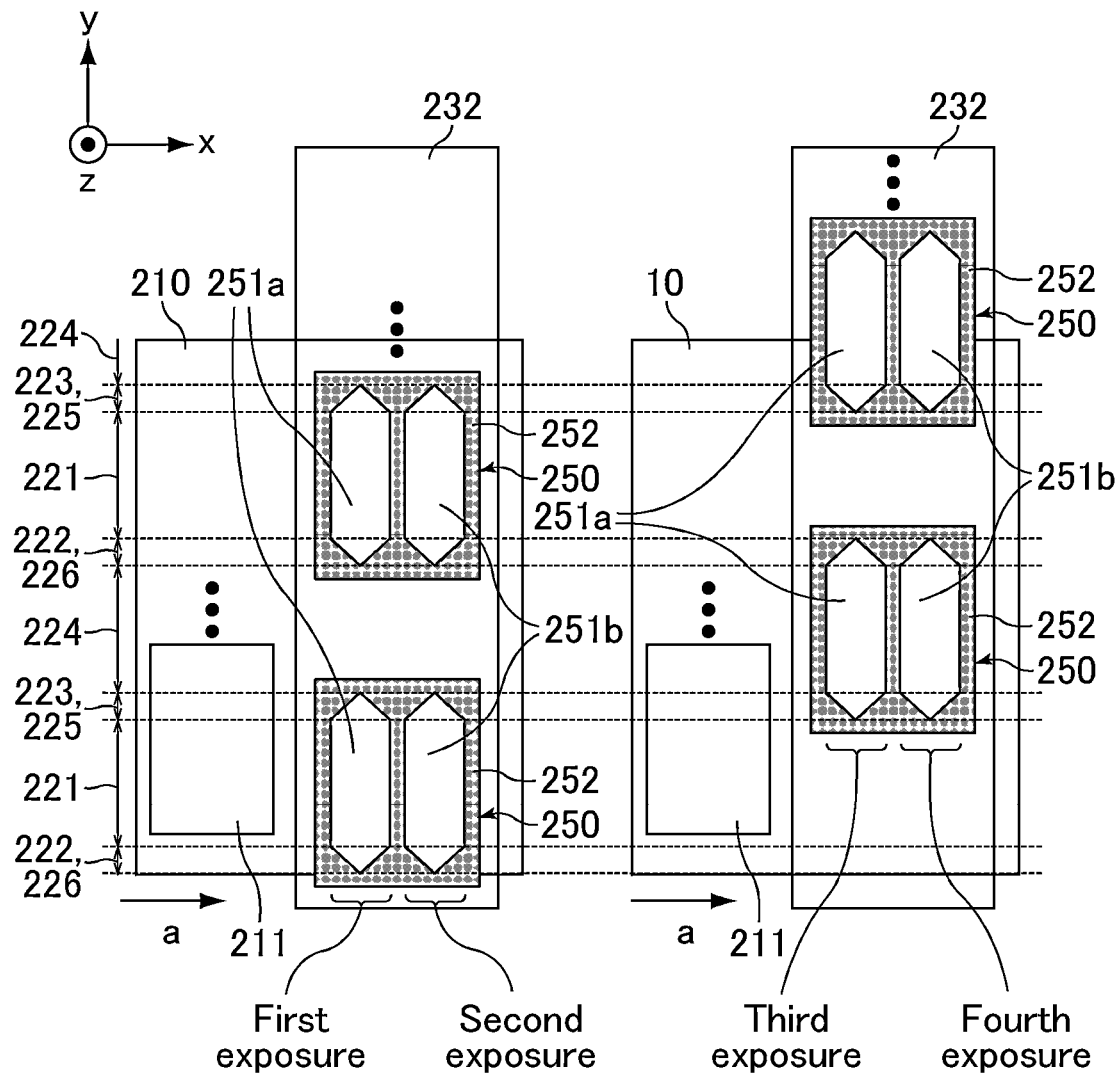
FIG. 24 is a plane view schematically illustrating a state of carrying out exposure to a TFT substrate surface in Embodiment 2.
Figure 25:
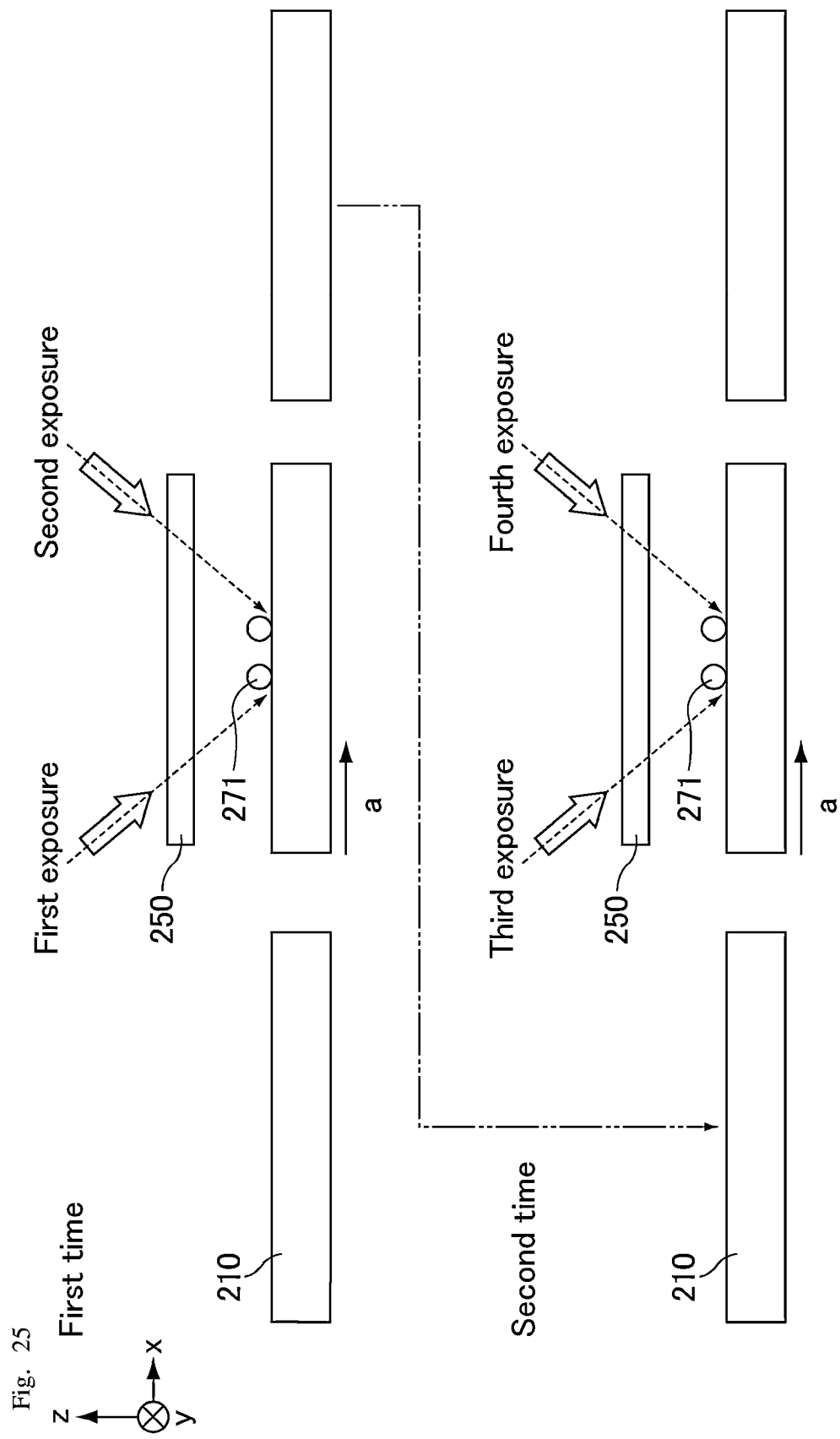
FIG. 25 is a cross-sectional view schematically illustrating a state of carrying out exposure to a TFT substrate surface in Embodiment 2.

FIG. 24 is a plane view schematically illustrating a state of carrying out exposure to a TFT substrate surface in Embodiment 2. FIG. 25 is a cross-sectional view schematically illustrating a state of carrying out exposure to a TFT substrate surface in Embodiment 2. As illustrated in FIG. 24, the exposure apparatus to be used in Embodiment 2 is a one-stage type scanning exposure apparatus and includes an exposure stage 232 including a plurality of exposure heads 231. Each of the exposure heads 231 includes photo masks 250 and each of the photo masks 250 includes a slit-like light transmission part with tapered both terminals, and is divided into a first light transmission part 251a for first exposure and a second light transmission part 251b for second exposure. The first light transmission part 251a and the second light transmission part 251b are arranged side by side so as to carry out exposure to the same region. The light transmission parts 251*a* and 251*b* of each of the photo masks 250 include a main region and a sub region likewise in Embodiment 1. The width of the main region is even, but the width of the sub region is narrowed as being apart from the main region. Accordingly, the amount of light transmitted through the sub region is lower than the amount of light transmitted through the main region. As a result, even if successive exposure is carried out, display unevenness in the boundary part can be prevented.

The photo masks 250 are arranged in a manner such that the longitudinal directions of the light transmission parts 251*a* and 251*b* is coincident with the lengthwise direction of the scanning signal line, that is, perpendicular to the lengthwise direction of the data signal line. As illustrated in FIG. 24 and FIG. 25, polarized ultraviolet rays are applied from one end to the other end of a region of the substrate 210 to which a photo-alignment film material is applied through the photo mask 250 while the substrate 210 is transferred at a constant speed in the +x axis direction (first exposure and second exposure). At this time, the substrate 210 is transferred to the direction perpendicular to the longitudinal directions of the light transmission parts 251*a* and 251*b* of the photo mask 250. As a result, exposure is carried out in a manner such that a first region 221 is exposed through the main regions of the light transmission parts 251*a* and 251*b* of the photo mask 250, and a second region 222 and a third region 223 are exposed through the sub regions of the light transmission parts 251*a* and 251*b* of the photo mask 250.

The incident angle of the light for exposure in the first exposure is reverse in positively and negatively to the incident angle of the light for exposure in the second exposure (that is, light is applied at an incident angle with the same absolute value from a directions different at 180°), and accordingly, so-called V-shaped exposure is carried out in the same manner as in Embodiment 1. That is, in Embodiment 2, both of the first exposure and the second exposure can be carried out by one time scanning, and thus the treatment time can be shortened as compared to that in Embodiment 1.

As illustrated in FIG. 25, a photo-alignment film in which liquid crystal molecules adjacent thereto are aligned substantially horizontally to the substrate surface (0° to 2° with respect to the substrate surface) is formed on the surface of the substrate 210 by the first exposure and the second exposure. In FIG. 25, the major axis of the liquid crystal molecules 271 is along the y axis direction.

On completion of the first exposure and the second exposure, the substrate 210 is then transferred to the −x axis direction and turned back to the starting position. Then, each exposure head 231 is transferred by the length of one exposure head in the +y axis direction; that is, by the length equal to addition of each one main region and each one sub region of the light transmission parts 251*a* and 251*b* of the photo mask 250.

As illustrated in FIG. 24 and FIG. 25, polarized ultraviolet rays are applied at the same incident angle as that of the first exposure and that of the second exposure from one end to the other end of a region of the substrate 210 to which a photo-alignment film material is applied through the photo mask 250 while the substrate 210 is transferred at a constant speed in the +x axis direction (third exposure and fourth exposure). At this time, the substrate 210 is transferred to the direction perpendicular to the longitudinal directions of the light transmission parts 251*a* and 251*b* of the photo mask 250. As a result, exposure is carried out in a manner such that a fourth region 224 is exposed through the main regions of the light transmission parts 251*a* and 251*b* of the photo mask 250, and a fifth region 225 and a sixth region 226 are exposed through the sub regions of the photo mask 250.

The incident angle of the light for exposure in the third exposure is reverse in positively and negatively to the incident angle of the light for exposure in the fourth exposure (that is, light is applied at an incident angle with the same absolute value from a directions different at 180°), and accordingly, so-called V-shaped exposure is carried out in the same manner as in the first exposure and the second exposure. That is, in Embodiment 2, both of the third exposure and the fourth exposure can be carried out by one time scanning, and thus the treatment time can be shortened as compared to that in Embodiment 1.

Figure 26:
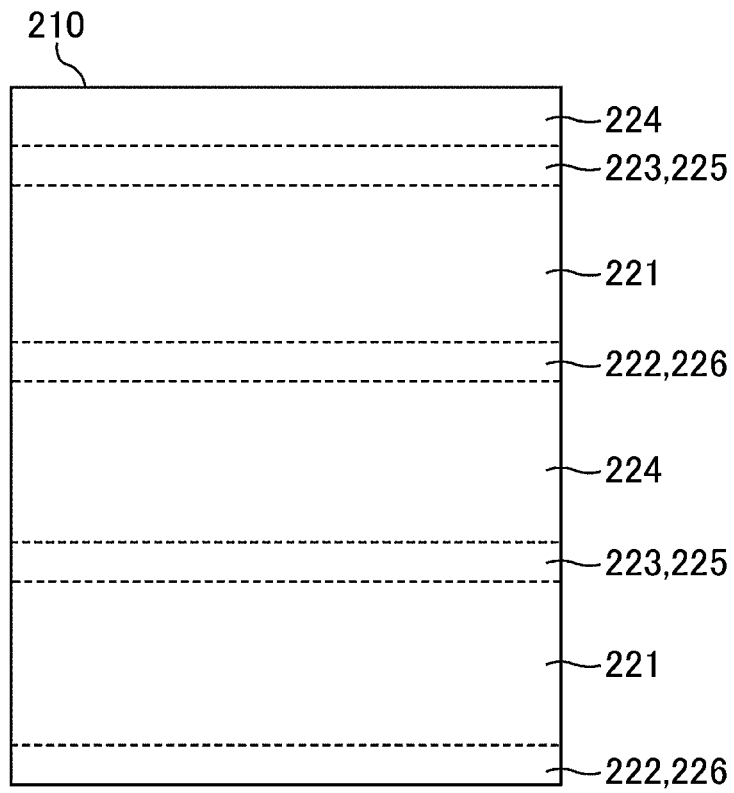
FIG. 26 is a plane view schematically illustrating an exposure region of a substrate after an exposure step in Embodiment 2.

FIG. 26 is a plane view schematically illustrating an exposure region of a substrate after an exposure step in Embodiment 2. According to the exposure method, the substrate 210 is exposed in the entire surface, and the photo-alignment treatment is completed. Further, the third region (joining region) 223 exposed through the sub region of the light transmission part of the photo mask in the first exposure and the second exposure and the fifth region (joining region) 225 exposed through the sub region of the light transmission part of the photo mask in the third exposure and the fourth exposure are overlapped and exposed two times, and the second region (joining region) 222 exposed through the sub region of the light transmission part of the photo mask in the first exposure and the second exposure and the sixth region (joining region) 226 exposed through the sub region of the light transmission part of the photo mask in the third exposure and the fourth exposure are overlapped and exposed two times.

Consequently, the light exposure amount in the region irradiated through the sub region of the light transmission part of the photo mask in the first exposure to fourth exposure is almost equal to the light exposure amount in the first region 221 and the fourth region 224 irradiated through the main region of the light transmission part of the photo mask in the first exposure to fourth exposure, and even alignment is obtained, and thus generation of display unevenness in a joining region can be prevented.

The above steps are carried out respectively for the mother glass substrate including TFT substrate configuration and the mother glass substrate including counter substrate configuration to complete the photo-alignment treatment for the respective substrates.

Herein, the case of the exposure apparatus 230 including one exposure stage 232 is described, but the exposure apparatus 230 may include a plurality of stages. For example, two stages in total may be given to the first exposure and the second exposure, as well as the third exposure and the fourth exposure.

Hereinafter, the characteristics of a liquid crystal display device manufactured by the manufacturing method of Embodiment 1 will be described.

Figure 27:
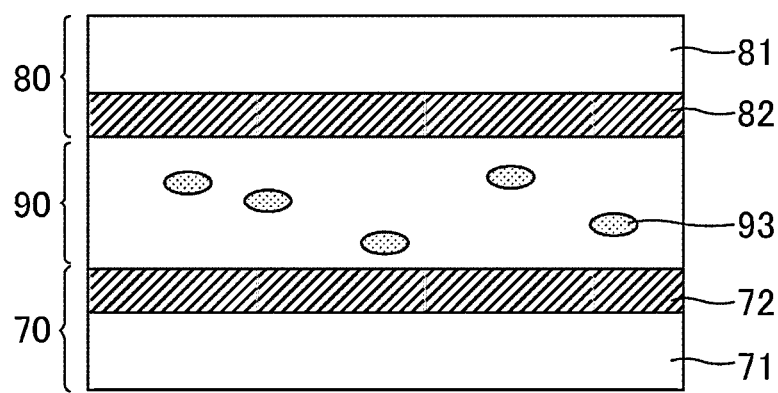
FIG. 27 is a cross-sectional view schematically illustrating a liquid crystal display device according to Embodiment 1 and showing before a PS polymerization process.
Figure 28:
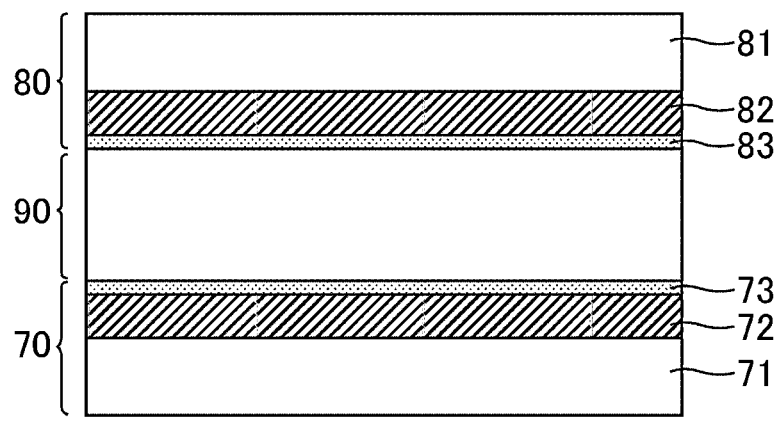
FIG. 28 is a cross-sectional view schematically illustrating a liquid crystal display device according to Embodiment 1 and showing after a PS polymerization process.

FIG. 27 and FIG. 28 are cross-sectional views schematically illustrating a liquid crystal display device according to Embodiment 1. FIG. 27 illustrates a liquid crystal display device showing before a PS polymerization process and FIG. 28 illustrates a liquid crystal display device showing after a PS polymerization process. As illustrated in FIG. 27 and FIG. 28, the liquid crystal display device of Embodiment 1 includes an array substrate 70, a color filter substrate 80, and a liquid crystal layer 90 that is interposed between a pair of substrates consisting of the array substrate 70 and the color filter substrate 80. The array substrate 70 includes an insulating transparent substrate 71 that is formed of glass or the like; and various kinds of wirings, pixel electrodes, TFTs, and the like that are formed on the transparent substrate 71. The color filter substrate 80 includes an insulating transparent substrate 81 that is formed of glass or the like; and color filters, black matrixes, and a common electrode that are formed on the transparent substrate 81. For example, in the IPS mode, an electrode is formed in only the array substrate 70. However, in the other modes, as necessary, an electrode is formed in both the array substrate 70 and the color filter substrate 80.

The array substrate 70 includes a horizontal alignment film 72 and the color filter substrate 80 also includes a horizontal alignment film 82. The horizontal alignment films 72 and 82 are films containing polyimide, polyamide, polyvinyl, polysiloxane, and the like as a main component. By providing the horizontal alignment films, liquid crystal molecules can be aligned in a certain direction. The horizontal alignment films 72 and 82 are formed of a photoactive material. For example, a material which includes a compound containing the above-described photoactive functional group may be used.

As illustrated in FIG. 27, before the PS polymerization process, there are polymerizable monomers 93 in the liquid crystal layer 90. Through the PS polymerization process, the polymerization of the polymerizable monomers 93 starts. As illustrated in FIG. 28, PS layers 73 and 83 are formed on the horizontal alignment films 72 and 82, and thus the stability of the alignment regulating force of the horizontal alignment films 72 and 82 is improved.

The PS layers 73 and 83 can be formed by injecting a liquid crystal composition containing a liquid crystal material and the polymerizable monomers into a gap between the array substrate 70 and the color filter substrate 80; and irradiating the liquid crystal layer 90 with a certain amount of light or applying heat thereto to polymerize the polymerizable monomers 93. At this time, by performing the polymerization in a state where no voltage is applied or in a state where a voltage lower than the threshold voltage is applied to the liquid crystal layer 90, the PS layers 73 and 83 capable of retaining the initial alignment of liquid crystal molecules are formed. Therefore, the PS layers 73 and 83 can be obtained with higher alignment stability. As necessary, a polymerization initiator may be added to the liquid crystal composition.

Examples of the polymerizable monomer 93 which can be used in Embodiment 1 include monomers which include a monofunctional or polyfunctional polymerizable group containing at least one kind of ring structure. Examples of such monomers include compounds represented by the following chemical formula (8).

[Chem. 8]

$$P^1-S_p^1-R^2-A^1-(Z-A^2)_n-R^1 \qquad (8)$$

(In the formula, $R^1$ represents a —$R^2$—$Sp^1$-$P^1$ group, a hydrogen atom, a halogen atom, a —CN group, an —$NO_2$ group, an —NCO group, an —NCS group, an —OCN group, an —SCN group, an —$SF_5$ group, or a linear or branched alkyl group having 1 to 12 carbon atoms;

$P^1$ represents a polymerizable group;

$Sp^1$ represents a linear, branched, or cyclic alkylene or alkyleneoxy group having 1 to 6 carbon atoms or a direct bond;

a hydrogen atom included in $R^1$ may be substituted with a fluorine atom or a chlorine atom;

as long as an oxygen atom and a sulfur atom are not adjacent to each other, a —$CH_2$— group included in $R^1$ may be substituted with an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_2)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or an —OCO—CH=CH— group.

$R^2$ represents an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_2)$— group, an —$N(C_2H_5)$— group, an —$N(C_2H_7)$— group, an —$N(C_4H_9)$— group, a —$CF_2O$— group, an —$OCF_2$— group, a —$CF_2S$— group, an —$SCF_2$— group, an —$N(CF_2)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, an —OCO—CH=CH— group, or a direct bond;

$A^1$ and $A^2$ are the same as or different from each other and each independently represents a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;

a —$CH_2$— group included in $A^1$ and $A^2$ may be substituted with an —O— group or an —S— group as long as they are not adjacent to each other;

a hydrogen atom included in $A^1$ and $A^2$ may be substituted with a fluorine atom, a chlorine atom, a —CN group, or an alkyl, alkoxy, alkylcarbonyl, alkoxycarbonyl, or alkylcarbonyloxy group having 1 to 6 carbon atoms;

each Z is the same or different from one another and represents an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, an —OCO—CH=CH— group, or a direct bond; and n represents 0, 1, or 2.)

More specific examples thereof include any of compound represented by the following chemical formulae (9-1) to (9-5).

[Chem. 9]

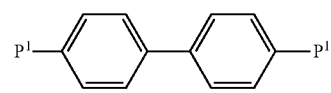

(9-1)

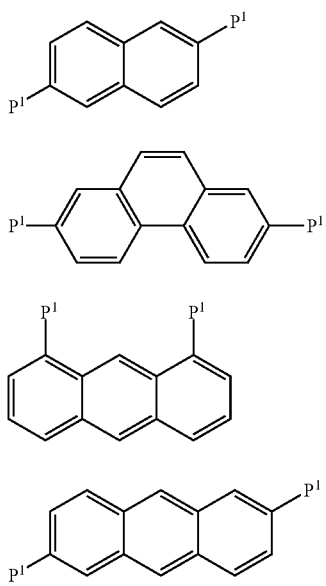

(9-2)

(9-3)

(9-4)

(9-5)

(In the formulae, each $P^1$ is the same as or different from one another and represents a polymerizable group; a part or all of hydrogen atoms included in a benzene ring may be substituted with a halogen atom or an alkyl or alkoxy group having 1 to 12 carbon atoms; and a part or all of hydrogen atoms included in the alkyl or alkoxy group having 1 to 12 carbon atoms may be substituted with a halogen atom.)

The monomers represented by the chemical formulae (9-1) to (9-5) are compounds which cause photocleavage to generate radicals when being irradiated with ultraviolet rays. Therefore, the polymerization can be performed without a polymerization initiator and thus deterioration in display quality such as image sticking, caused by a residual polymerization initiator after the PS process, can be prevented.

Examples of $P^1$ include an acryloyloxy group, a methacryloyloxy group, a vinyl group, a vinyloxy group, an acryloylamino group, and a methacryloylamino group.

Examples of other polymerizable monomers 93 which can be used in Embodiment 1 include any of compounds represented by the following chemical formulae (10-1) to (10-8).

[Chem. 10]

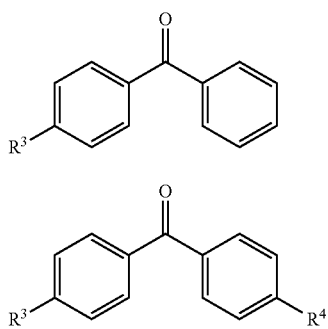

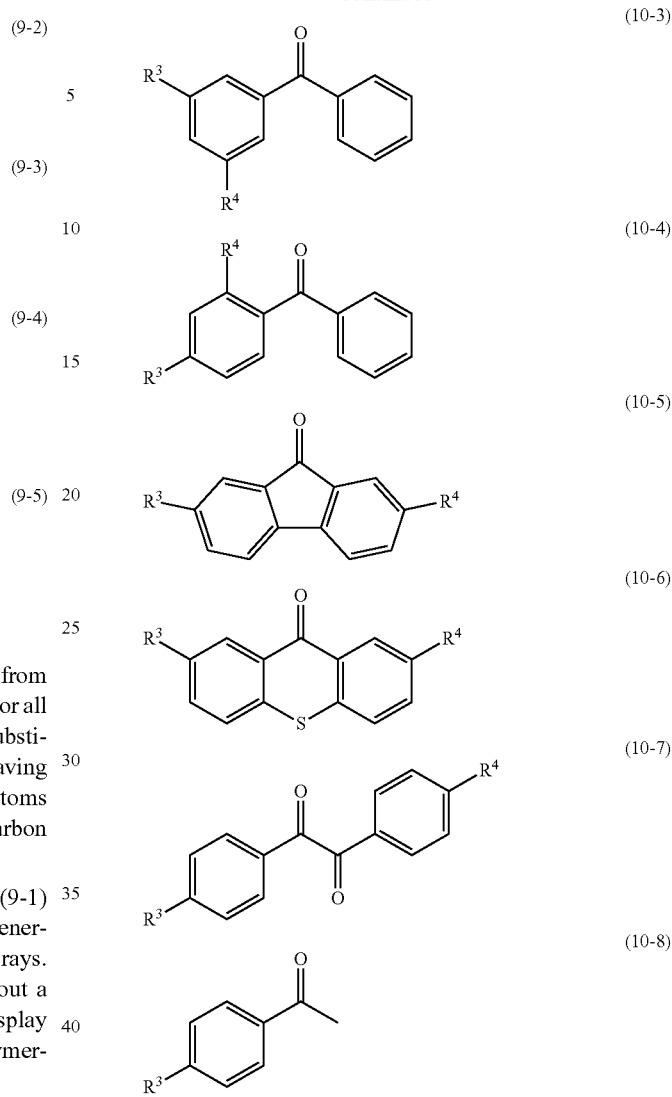

(In the formulae, $R^3$ and $R^4$ are the same as or different from each other and each independently represents an —$Sp^2$-$P^2$ group, a hydrogen atom, a halogen atom, a —CN group, an —$NO_2$ group, an —NCO group, an —NCS group, an —OCN group, an —SCN group, an —$SF_5$ group, or a linear or branched alkyl, aralkyl, phenyl group having 1 to 12 carbon atoms;

at least one of $R^3$ and $R^4$ includes an —$Sp^2$-$P^2$ group;

$P^2$ represents a polymerizable group;

$Sp^2$ represents a linear, branched, or cyclic alkylene or alkyleneoxy group having 1 to 6 carbon atoms, or a direct bond;

when at least one of $R^3$ and $R^4$ represents a linear or branched alkyl, aralkyl, or phenyl group having 1 to 12 carbon atoms, a hydrogen atom included in at least one of $R^3$ and $R^4$ may be substituted with a fluorine atom, a chlorine atom, or an —$Sp^2$-$P^2$ group;

as long as an oxygen atom, a sulfur atom, and a nitrogen atom are not adjacent to each other, a —$CH_2$— group included in $R^1$ and R may be substituted with an —O— group, an —S— group, an —NH— group, a —CO— group, a —COO— group, an —OCO— group, an —O—COO— group, an —$OCH_2$— group, a —$CH_2O$— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, or an —OCO—CH═CH— group;

a part or all of hydrogen atoms included in a benzene ring may be substituted with a halogen atom or an alkyl or alkoxy group having 1 to 12 carbon atoms; and apart or all of hydrogen atoms included in the alkyl or alkoxy group having 1 to 12 carbon atoms may be substituted with a halogen atom.)

Examples of P$^2$ include an acryloyloxy group, a methacryloyloxy group, a vinyl group, a vinyloxy group, an acryloylamino group, and a methacryloylamino group.

The monomers represented by the chemical formulae (10-1) to (10-8) are compounds in which hydrogen atoms are removed to generate radicals when being irradiated with visible light. Therefore, the polymerization can be performed without a polymerization initiator and thus deterioration in display quality such as image sticking, caused by a residual polymerization initiator after the PS process, can be prevented.

In the liquid crystal display device, the array substrate 70, the liquid crystal layer 90, and the color filter substrate 80 are laminated in the stated order from a back surface side to an observation surface side of the liquid crystal display device to form a liquid crystal cell. A polarizing plate is attached onto the back surface side of the array substrate 70 and the observation surface side of the color filter substrate 80. These polarizing plates may be provided with a retarder; and may be a circularly polarizing plate.

The liquid crystal display device may be any one of transmission type, reflection type, and transflective type devices. When the liquid crystal display device according to Embodiment 1 is a transmission type or transflective type device, a back light unit is further provided. The back light unit is arranged on the back surface side of the liquid crystal cell such that light passes through the array substrate 70, the liquid crystal layer 90, and the color filter substrate 80 in the stated order. When the liquid crystal display device is a reflection type or transflective type device, the array substrate 70 is provided with a reflector for reflecting outside light. In addition, at least in a region in which reflected light is used as display light, it is necessary that the polarizing plate on the color filter substrate 80 be a circularly polarized plate.

The liquid crystal display device may include a color filter on array configuration; that is, the array substrate 70 includes a color filter. The liquid crystal display device may also include a black matrix on array configuration; that is, the array substrate 110 includes a black matrix. The liquid crystal display device according to Embodiment 1 may be a monochrome display or a field sequential color display, and in this case, there is no need to arrange a color filter.

The liquid crystal layer 90 is filled with a liquid crystal material having the property of being aligned in a specific direction by applying a certain voltage thereto. The alignment of liquid crystal molecules in the liquid crystal layer 90 is controlled by the application of a threshold or higher voltage. The liquid crystal molecules are preferable to include a structure formed by linearly linking two ring structures and groups bonded to the ring structures. Examples of the liquid crystal molecules include liquid crystal molecules including, as a core portion, a structure in which two ring structures of at least one kind selected from a benzene ring, cyclohexylene, and cyclohexene are linked to a para position by a direct bond or a linking group; and a structure in which at least one kind selected from a hydrocarbon group having 1 to 30 carbon atoms and a cyano group is bonded to both sides (para position) of the core portion. The core portion may include a substituent and may include an unsaturated bond.

The liquid crystal material filled into the liquid crystal layer is preferable to include liquid crystal molecules containing at least one molecular structure selected from a group consisting of the following chemical formulae (11-1) to (11-6). Among these, a molecular structure represented by the following chemical formula (11-4) is particularly preferable.

[Chem. 11]

(11-1)

(11-2)

(11-3)

(11-4)

(11-5)

(11-6)

More specifically, the liquid crystal material is preferable to contain at least one liquid crystal molecule selected from a group consisting of the following chemical formulae (12) to (16).

[Chem. 12]

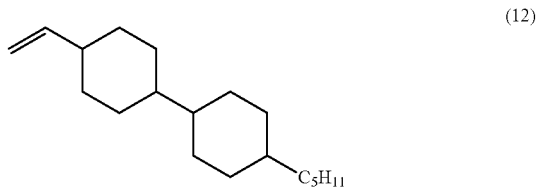
(12)

[Chem. 13]

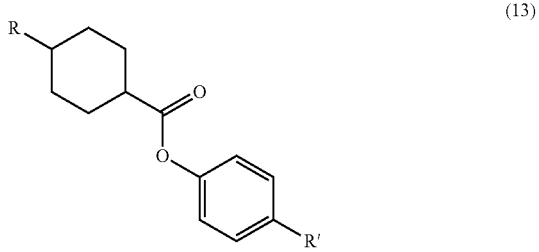
(13)

[Chem. 14]

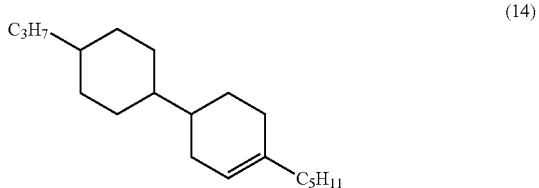
(14)

[Chem. 15]

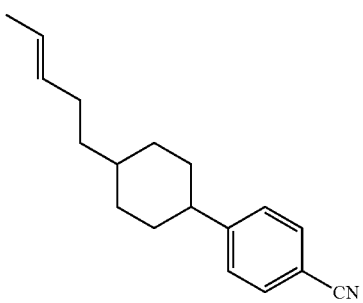

(15)

[Chem. 16]

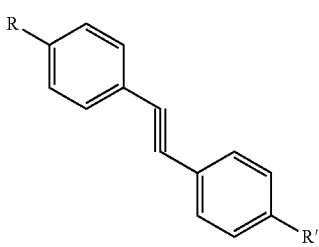

(16)

In the formulae (13) and (16), R and R' are the same as or different from each other and each independently represents a hydrocarbon group having 1 to 30 carbon atoms. The hydrocarbon group may include a substituent and may include an unsaturated bond.

Components of the alignment films, components of monomers included in the PS layers, and the like can be analyzed by decomposing the liquid crystal display device and chemically analyzing the respective components using gas chromatograph mass spectrometry (GC-MS) and time-of-fright secondary ion mass spectrometry (TOF-SIMS). In addition, the cross-sectional shape of a liquid crystal cell including the alignment films and the PS layers can be confirmed by microscopic observation using a scanning transmission electron microscope (STEM), a scanning electron microscope (SEM) or the like.

Hereinafter, an example of actually preparing a liquid crystal cell included in the liquid crystal display device according to Embodiment 1 will be described.

EXAMPLE 1

Figure 29:
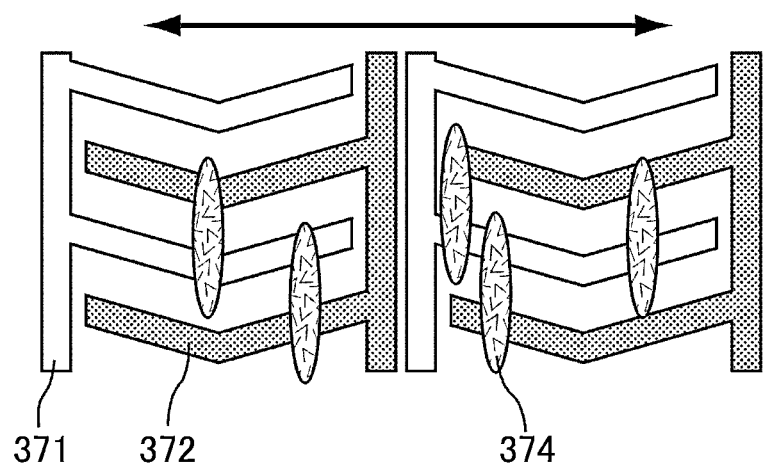
FIG. 29 is a plane view schematically illustrating an IPS substrate of Examples 1 to 4, 6, and 7.

Example 1 is a preparation example of a liquid crystal cell of the IPS mode. An IPS substrate including a pair of comb-teeth electrodes which are transparent electrodes (pixel electrode and common electrode) and TFT; and a bare glass substrate (counter substrate) were prepared. A polyvinyl cinnamate solution which was a material of a horizontal alignment film was applied on the respective substrates by a spin coating method. FIG. 29 is a plane view schematically illustrating an IPS substrate of Example 1. As the glass, #1737 (manufactured by Corning Inc.) was used. In the comb-teeth electrodes, as illustrated in FIG. 29, a pixel electrode 371 and a common electrode 372 extend substantially parallel to each other and are respectively formed in a zigzag shape. As a result, since the electric field vector during electric field application is substantially perpendicular to a lengthwise direction of the electrodes, a multidomain structure is formed and thus superior viewing angle characteristics can be obtained. Superior viewing angle characteristics can be obtained. A double-headed arrow in FIG. 29 indicates an irradiation polarization direction (in a case where negative type liquid crystal molecules are used). As a material of the comb-teeth electrodes, IZO was used. In addition, the width L of the comb-teeth electrodes was 3 µm, and the distance S between the electrodes was 9 µm. The polyvinyl cinnamate solution was prepared by dissolving 3% by weight of polyvinyl cinnamate with respect to the total weight in a solvent obtained by mixing the same amount of N-methyl-2-pyrollidone and ethylene glycol monobutyl ether.

After application by a spin coating method, provisional drying was performed at 90° C. for 1 minute, followed by baking at 200° C. for 60 minutes while purging nitrogen gas. The thickness of the alignment films after baking was 100 nm.

Next, an alignment treatment was carried out for the surface of each substrate by using the method (V-shaped exposure) according to Embodiment 1. Specifically, the same region was irradiated with polarized ultraviolet rays having a wavelength of 313 nm and a total amount of 5 J/cm$^2$ twice. The lights employed for the two times light irradiation were respectively applied from directions different at 180° and from slanting directions at 40° to the normal direction with respect to the each substrate. At this time, an angle formed between the lengthwise direction of the comb-teeth electrodes and the polarization direction was set to ±15°. As a result, liquid crystal molecules 374 were aligned in a direction substantially perpendicular to the polarization direction of polarized ultraviolet rays during voltage non-application; and were aligned in a direction substantially perpendicular to the lengthwise direction of the comb-teeth electrodes during the application of a threshold or higher voltage.

Next a thermosetting seal material (HC 1413EP: manufactured by Mitsui Chemicals, Inc.) was printed on the IPS substrate using a screen plate. Furthermore, in order to obtain the liquid crystal layer having a thickness of 3.5 µm, beads (SP-2035, manufactured by Sekisui Chemical Co., Ltd.) having a diameter of 3.5 µm were dispersed on the counter substrate. These two kinds of substrates were aligned such that the polarization directions of ultraviolet rays irradiating the respective substrates match with each other, and then were bonded.

Next, the bonded substrates were heated at 200° C. for 60 minutes in a furnace in which nitrogen gas was purged while applying a pressure of 0.5 kgf/cm$^2$ thereto, and thereby the seal material was cured.

A liquid crystal composition containing a liquid crystal material and a monomer was injected into a cell prepared with the above-described method under vacuum. As the liquid crystal material, a negative type liquid crystal which includes liquid crystal molecules containing a multiple bond other than a benzene ring was used. As the monomer, biphenyl-4, 4'-diylbis(2-methyl acrylate) was used. The amount of biphenyl-4,4'-diylbis(2-methyl acrylate) added is 1% by weight with respect to the total weight of the entire liquid crystal composition.

An inlet of a cell through which the liquid crystal composition was injected was blocked with an ultraviolet ray-curable resin (TB3026E, manufactured by ThreeBond Co., Ltd.) and was sealed by ultraviolet ray irradiation. The wavelength of ultraviolet rays applied for sealing was 365 nm, and light was blocked in pixel portions so as to remove the influence of ultraviolet rays as much as possible. At this time, electrodes were short-circuited and the charge of a surface of the glass substrate was eliminated such that the alignment of liquid crystal was not disordered by outside electric field.

Next, in order to remove the flow alignment of liquid crystal molecules, a realignment treatment of heating the liquid crystal cell at 130° C. for 40 minutes to make the liquid crystal molecules have isotropic phase was performed. As a result, a liquid crystal cell was obtained in which liquid crystal molecules were uniaxially aligned in the plane of the substrates in a direction perpendicular to the polarization direction of ultraviolet rays irradiating the alignment films.

Next, in order to subject this liquid crystal cell to the PS process, the liquid crystal cell was irradiated with ultraviolet rays having an intensity of 2 J/cm² using a black light unit (FHF32BLB, manufactured by TOSHIBA Corporation). As a result, biphenyl-4,4'-diylbis(2-methyl acrylate) was polymerized.

The reaction systems (pathways of generating acrylate radicals) of the PS process in Example 1 are as follows.
(Reaction System 1)

First, as illustrated in the following chemical reaction formula (18), a biphenyl bifunctional methacrylate monomer (biphenyl-4,4'-diylbis(2-methyl acrylate); compound represented by the following chemical formula (17), hereinafter abbreviated as "M") is excited by ultraviolet ray irradiation to form radicals (hereinafter, the excitation state will be indicated by the symbol *). That is, the monomer used in Example 1 is a monomer having function of a polymerization initiator for spontaneously starting polymerization without a polymerization initiator.

[Chem. 17]

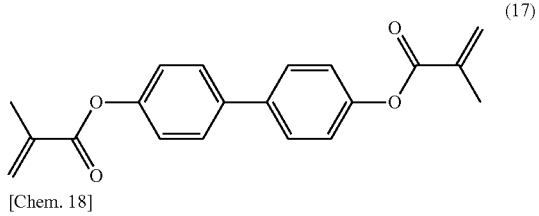

(17)

[Chem. 18]

(18)

(Reaction System 2)

On the other hand, as illustrated in the following chemical reaction formula (20), polyvinyl cinnamate (compound represented by the following chemical formula (19); hereinafter, abbreviated as "PVC") which is the photo-alignment film material is also excited by ultraviolet ray irradiation.

[Chem. 19]

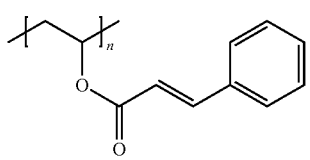

(19)

(n represents a natural number.)

[Chem. 20]

(20)

In addition, as illustrated in the following chemical reaction formula (21), biphenyl-4,4'-diylbis(2-methyl acrylate) which is the monomer is excited to form radicals by the energy transfer from excited polyvinyl cinnamate.

[Chem. 21]

$$M+PVC^* \rightarrow M^*+PVC \qquad (21)$$

The reason why the reactivity of the PS process is improved is considered to be as follows. In the process of polymerizing biphenyl-4,4'-diylbis(2-methyl acrylate) which is the monomer with ultraviolet rays, it is considered that an intermediate such as a radical serves an important function. The intermediate is generated by ultraviolet rays, but the amount of the monomer in the liquid crystal composition is only 1% by weight. Therefore, sufficient polymerization efficiency is not obtained only with the pathway of the chemical reaction formula (18). When the PS process is performed only with the pathway of the chemical reaction formula (18), it is necessary that excited monomer intermediates be adjacent to each other in the liquid crystal bulk and thus the polymerization efficiency is low. In addition, since it is necessary that the monomer intermediates in which polymerization has already started move to the vicinity of the alignment films after the polymerization, the rate of the PS process is slow. In this case, it is considered that the rate of the PS process highly depends on the temperature and the diffusion coefficient.

However, when the photo-alignment films are present, as illustrated in the chemical reaction formulae (20) and (21), the photo-alignment films contain a large amount of double bonds as a photofunctional group such as polyvinyl cinnamate in the present example. Therefore, it is considered that the photofunctional groups are easily excited by ultraviolet rays and the excitation energy is transferred to the monomer in liquid crystal. Furthermore, since this energy transfer occurs in the vicinity of the alignment films, the existence probability of the monomer intermediates in the vicinity of the alignment films is significantly increased, thereby remarkably increasing the polymerization probability and the rate of the PS process. Therefore, in this case, it is considered that the rate of the PS process is difficult to depend on the temperature and the diffusion coefficient.

In addition, in the photo-alignment films, electrons at a photoactive unit are excited by light irradiation. In addition, when the photo-alignment films are horizontal alignment films, the photoactive unit directly interacts with the liquid crystal layer to align liquid crystal. Therefore, the intermolecular distance between a photoactive unit and polymerizable monomers is shorter than that of a vertical alignment film and thus the probability of the transfer of excitation energy is significantly increased. When the photo-alignment films are a vertical alignment film, there is inevitably a hydrophobic group between a photoactive unit and polymerizable monomers. Therefore, the intermolecular distance is increased and the energy transfer is difficult to occur. Therefore, the PS process is particularly preferable for a horizontal alignment film.

When observed by using a polarizing microscope, liquid crystal molecules in a photo-aligned IPS cell (liquid crystal cell of Example 1), which was prepared with the above-described method and was subjected to the PS process, were uniaxially aligned in a favorable manner as was before the PS process. Furthermore, when liquid crystal was made to respond by applying a threshold or higher electric field thereto, the liquid crystal was aligned along zigzag-shaped comb-teeth electrodes and superior viewing angle characteristics were obtained by a multidomain structure.

Next, the liquid crystal cell of Example 1 was evaluated for image sticking. An evaluation method for image sticking is as follows. The liquid crystal cell of Example 1 was divided into regions X and Y to which two different voltages can be applied. A square wave voltage of 6 V and 30 Hz was applied to the region X and no voltage was applied to the region Y for 48 hours. Next, a square wave voltage of 2.4 V and 30 Hz was applied to the regions X and Y, respectively. Then, the luminance T(x) of the region X and the luminance T(y) of the region Y were measured, respectively. In order to measure the luminance, a digital camera (EOS Kiss Digital N EF-S18-55II U, manufactured by Canon Inc.) was used. A value $\Delta T(x, y)$ (%) which is the index of image sticking was calculated according to the following expression.

$$\Delta T(x,y)=(|T(x)-T(y)|/T(y))\times 100$$

As a result of the calculation, the image sticking ratio $\Delta T$ of the liquid crystal cell of Example 1 was only 24%.

As seen from Example 1, severe image sticking caused by a material of a photo-alignment film can be significantly reduced by performing the PS process without deterioration in alignment capability. Since image sticking is significantly reduced, the irradiation amount (time) of ultraviolet rays can be reduced in the PS process. When a liquid crystal panel is manufactured, the irradiation amount (time) of ultraviolet rays is reduced and thus the throughput is increased. In addition, the size of an ultraviolet ray irradiation device can be reduced, which leads to a reduction in investment value.

REFERENCE EXAMPLE 1

An IPS liquid crystal cell of Reference Example 1 was produced in the same manner as in Example 1, except that the monomer was not added to the liquid crystal composition; and the liquid crystal layer was not irradiated with ultraviolet rays using a black light unit.

As a result, the image sticking ratio was 800% or greater, and severe image sticking occurred.

That is, the only difference between the IPS liquid crystal cell of Reference Example 1 and the IPS liquid crystal cell of Example 1 was whether the PS process was performed or not. Image sticking occurs due to the interaction between liquid crystal molecules and photo-alignment film molecules. However, by forming the PS layer on the origin thereof as a buffer layer, image sticking can be prevented. It should be noted that image sticking caused by the photo-alignment film can be significantly suppressed while liquid crystal molecules can be aligned by the alignment capability of the photo-alignment film originating from the PS layer which is not subjected to an alignment treatment.

REFERENCE EXAMPLE 2

In Reference Example 2, a positive type liquid crystal of 4-cyano-4'-pentylbiphenyl including a triple bond was used as a liquid crystal material; and the monomer was not added to the liquid crystal composition. In addition, as a photo-alignment treatment, an angle formed between the lengthwise direction of the comb-teeth electrodes and the polarization direction of polarized ultraviolet rays was set to ±75°; and a black light unit was not used for the ultraviolet ray irradiation. Except for the above-described points, an IPS liquid crystal cell of Reference Example 2 was prepared in the same manner as in Example 1.

As a result, the image sticking ratio was 800% or greater, and severe image sticking occurred.

EXAMPLE 2

FIG. 29 is also a plane view schematically illustrating an IPS substrate of Example 2. An IPS liquid crystal cell of Example 2 was produced in the same manner as in Reference Example 2, except that 1% by weight of biphenyl-4,4'diylbis (2-methyl acrylate), as the monomer, with respect to the total weight of the entire liquid crystal composition was added to the positive type liquid crystal of 4-cyano-4'-pentylbiphenyl. When observed by using a polarizing microscope, liquid crystal molecules were uniaxially aligned in a favorable manner. Furthermore, when liquid crystal was made to respond by applying a threshold or higher electric field thereto, the liquid crystal was aligned along zigzag-shaped comb-teeth electrodes and superior viewing angle characteristics were obtained by a multidomain structure. In addition, the image sticking ratio was 11% when measured with the same manner as in Reference Example 2, and a significant improvement effect was obtained.

The reaction systems (pathways of generating acrylate radicals) of the PS process in Example 2 are as follows.
(Reaction System 1)

First, as illustrated in the following chemical reaction formula (22), biphenyl-4,4'-diylbis(2-methyl acrylate) which is the monomer is excited by ultraviolet ray irradiation to form radicals.

[Chem. 22]

(Reaction System 2)

On the other hand, as illustrated in the following chemical reaction formula (23), polyvinyl cinnamate which is the photo-alignment film material is also excited by ultraviolet ray irradiation.

[Chem. 23]

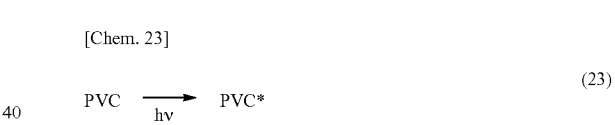

In addition, as illustrated in the following chemical reaction formula (24), biphenyl-4,4'-diylbis(2-methyl acrylate) which is the monomer is excited to form radicals by the energy transfer from excited polyvinyl cinnamate.
[Chem. 24]

(Reaction System 3)

On the other hand, as illustrated in the following chemical reaction formula (26), 4-cyano-4'-pentylbiphenyl (compound represented by the following chemical formula (25); hereinafter, abbreviated as "CB") which is the liquid crystal material including a triple bond in the molecules is also excited by ultraviolet ray irradiation.

[Chem. 25]

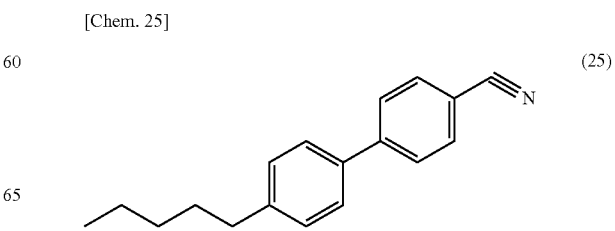

-continued

[Chem. 26]

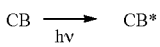
(26)

As illustrated in the following chemical reaction formula (27), biphenyl-4,4'-diylbis(2-methyl acrylate) which is the monomer is excited to form radicals by the energy transfer from excited 4-cyano-4'-pentylbiphenyl.
[Chem. 27]

M+CB*→M*+CB (27)

(Reaction System 4)
On the other hand, as illustrated in the following chemical reaction formula (28), polyvinyl cinnamate which is the photo-alignment film material is also excited by ultraviolet ray irradiation.

[Chem. 28]

(28)

In addition, as illustrated in the following chemical reaction formula (29), a pathway is considered in which 4-cyano-4'-pentylbiphenyl which is the liquid crystal material including a triple bond in the molecules is excited by the energy transfer from excited polyvinyl cinnamate.
[Chem. 29]

CB+PVC*→CB*+PVC (29)

The difference between Example 2 and Example 1 is that the positive type liquid crystal of 4-cyano-4'-pentylbiphenyl was used as the liquid crystal material. When Example 1 and Example 2 are compared to each other, a higher improvement effect was obtained in Example 2. The reason is considered to be that the cyano group in the liquid crystal molecules contains a triple bond. A double bond of a benzene ring not containing a substituent does not contribute to the reaction. Therefore, it can be concluded that the triple bond of the cyano group serves an important function.

In this way, when liquid crystal molecules include a multiple bond, image sticking is reduced by the PS process. The reason is considered to be as follows. As illustrated in the chemical reaction formulae (20) and (21), the excited monomer intermediates of Example 1 are generated by the energy transfer from ultraviolet rays and the photo-alignment films. However, since 4-cyano-4'-pentylbiphenyl contains the triple bond of the cyano group in the molecules, the liquid crystal molecules are excited by radicals and the like. In addition, it is considered that the PS process is promoted through, for example, pathways illustrated in the chemical reaction formulae (26) and (27) as well as the reaction systems illustrated in the chemical reaction formulae (20) and (21). Furthermore, as illustrated in the chemical reaction formulae (28) and (29), a pathway is also considered in which the energy is transferred from the excited photo-alignment films to liquid crystal molecules and thus the liquid crystal molecules are excited. That is, since the monomer is excited through more pathways than that of Example 1, the PS process is further promoted.

EXAMPLE 3

FIG. 29 is also a plane view schematically illustrating an IPS substrate of Example 3. A cell was prepared in the same manner as in Example 2, except that 37% by weight of liquid crystalline molecules of trans-4-propyl-4'-vinyl-1,1'-bicyclohexane with respect to the total weight of the entire liquid crystal composition; and 1% by weight of biphenyl-4,4'diyl-bis(2-methyl acrylate), as the monomer, with respect to the total weight of the entire liquid crystal composition were added to 4-cyano-4'-pentylbiphenyl which was the positive type liquid crystal material. That is, in the present example, as a liquid crystal component in the liquid crystal composition, mixed liquid crystal was used. When observed by using a polarizing microscope, liquid crystal molecules were uniaxially aligned in a favorable manner. Furthermore, when liquid crystal was made to respond by applying a threshold or higher electric field thereto, the liquid crystal was aligned along zigzag-shaped comb-teeth electrodes and superior viewing angle characteristics were obtained by a multidomain structure. In addition, the image sticking ratio was only 3% when measured in the same manner as in Example 2. Therefore, according to Example 3, it was found that image sticking was further reduced compared to Example 2.

The reaction systems (pathways of generating acrylate radicals) of the PS process in Example 3 are as follows.

First, as illustrated in the following chemical reaction formula (31), trans-4-propyl-4'-vinyl-1,1'-bicyclohexane (compound represented by the following chemical formula (30); hereinafter, referred to as "CC") which is the liquid crystal material is excited by ultraviolet ray irradiation.

[Chem. 30]

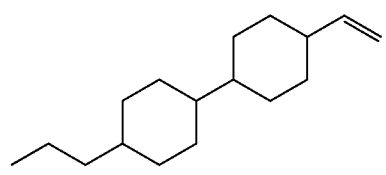
(30)

[Chem. 31]

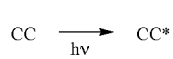
(31)

In addition, as illustrated in the following chemical reaction formula (32), biphenyl-4,4'-diylbis(2-methyl acrylate) which is the monomer is excited to form radicals by the energy transfer from excited trans-4-propyl-4'-vinyl-1,1'-bicyclohexane.
[Chem. 32]

M+CC*→M*+CC (32)

As illustrated in the chemical reaction formulae (31) and (32), when liquid crystal molecules including a multiple bond are used, image sticking is significantly reduced by the PS process. In particular, when liquid crystal molecules including a double bond are used, the effect thereof is high. That is, trans-4-propyl-4'-vinyl-1,1'-bicyclohexane has higher efficiency of excitation using ultraviolet rays; and higher efficiency of energy transfer with the photo-alignment films or liquid crystal molecules than those of 4-cyano-4'-pentylbiphenyl used in Examples 1 to 3. The difference in reactivity between two kinds of molecules is caused by whether the molecules include a triple bond of a cyano group or an alkenyl group. In the other words, a double bond has higher reaction efficiency than that of a triple bond.

EXAMPLE 4

FIG. 29 is also a plane view schematically illustrating an IPS substrate of Example 4. An IPS liquid crystal cell was prepared in the same manner as in Example 3, except that the time of the irradiation from a black light unit was set to be ⅙ that of Example 3; and the irradiation intensity was set to 350 mJ/cm². When observed by using a polarizing microscope, liquid crystal molecules were uniaxially aligned in a favorable manner. Furthermore, when liquid crystal was made to respond by applying a threshold or higher electric field thereto, the liquid crystal was aligned along zigzag-shaped comb-teeth electrodes and superior viewing angle characteristics were obtained by a multidomain structure. In addition, the image sticking ratio was only 8% when measured in the same manner as in Example 2. Therefore, it was found that a sufficient image sticking prevention effect can be obtained even when the energy and time of ultraviolet ray irradiation are reduced in the PS process.

When Examples 1 to 4 described above are investigated, common advantageous effects of these examples are as follows.

In an actual usage configuration, in the case visible light is exposed (for example, a liquid crystal TV), visible light should be avoided as light used for an alignment treatment of a photo-alignment film. However, in Examples 1 to 4, by performing the PS process, the surfaces of the alignment films are covered with the PS layers and the alignment is immobilized. Therefore, there is an advantageous effect in that a material of which the sensitivity wavelength includes a visible light wavelength range may be used as the material of the photo-alignment films.

In addition, when the sensitivity wavelength of the material of the photo-alignment films includes an ultraviolet ray wavelength range, it is necessary that an ultraviolet ray absorption layer be provided in order to cut weak ultraviolet rays emitted from a back light unit and the surrounding environment. In consideration of this point, there is an advantageous effect in that, by performing the PS process, it is not necessary that an ultraviolet ray absorption layer be provided.

In addition, when the PS process is performed using ultraviolet rays, there is a possibility that the voltage holding ratio (VHR) may deteriorate by liquid crystal being irradiated with ultraviolet rays. By efficiently performing the PS process as in the case of Examples 1 to 4, the ultraviolet ray irradiation time can be reduced and thus deterioration in voltage holding ratio can be avoided.

Furthermore, since image sticking is significantly reduced, the irradiation amount (time) for the PS process can also be reduced. When a liquid crystal panel is manufactured, the irradiation amount (time) is reduced and thus the throughput is increased. In addition, the size of an ultraviolet ray irradiation device can be reduced, which leads to a reduction in investment value.

EXAMPLE 5

Figure 30:
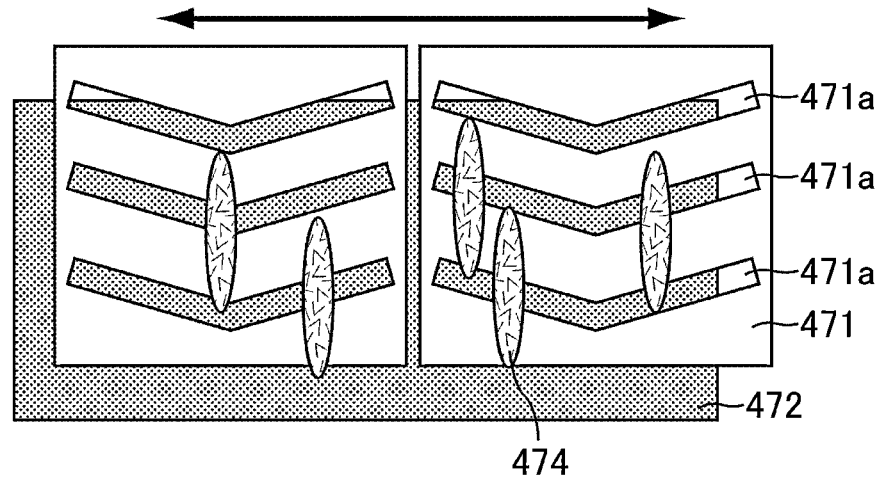
FIG. 30 is a plane view schematically illustrating an FFS substrate of Example 5.

Example 5 is a preparation example of a liquid crystal cell of the FFS mode. FIG. 30 is a plane view schematically illustrating an FFS substrate of Example 5. An FFS substrate including TFT, a slit-provided electrode (pixel electrode) 471 and a plate-like plate electrode (common electrode) 472; and a counter substrate including a color filter were prepared. A polyvinyl cinnamate solution which was a material of a horizontal alignment film was applied on the respective substrates by a spin coating method. As the glass, #1737 (manufactured by Corning Inc.) was used. As a material for the slit-provided electrode 471, ITO was used. The shape of the slit-provided electrode 471 was a V shape, the width L of slit 471a was 5 μm, and the distance S of slits 471a was 5 μm. The polyvinyl cinnamate solution was prepared by dissolving 3% by weight of polyvinyl cinnamate with respect to the total weight in a solvent obtained by mixing the same amount of N-methyl-2-pyrollidone and ethylene glycol monobutyl ether.

After application by a spin coating method, provisional drying was performed at 90° C. for 1 minute, followed by baking at 200° C. for 60 minutes while purging nitrogen gas. The thickness of the alignment films after baking was 100 nm.

Next, an alignment treatment was carried out for the surface of each substrate by using the method (V-shaped exposure) according to Embodiment 1. Specifically, the same region was irradiated with polarized ultraviolet rays having a wavelength of 313 nm and a total amount of 100 mJ/cm² twice. The lights employed for the two times light irradiation were respectively applied from directions different at 180° and from slanting directions at 40° to the normal direction with respect to the substrate. At this time, an angle formed between the lengthwise direction of the slits and the polarization direction was set to ±7°. As a result, liquid crystal molecules 474 were aligned in a direction substantially perpendicular to the polarization direction of polarized ultraviolet rays during voltage non-application; and were aligned in a direction substantially perpendicular to the lengthwise direction of the slits 471a of the slit-provided electrode 471 during the application of a threshold or higher voltage.

Next, a thermosetting seal material (HC1413EP, manufactured by Mitsui Chemicals, Inc.) was printed on the FFS substrate using a screen plate. Furthermore, in order to obtain the liquid crystal layer having a thickness of 3.5 μm, beads (SP-2035, manufactured by Sekisui Chemical Co., Ltd.) having a diameter of 3.5 μm were dispersed on the counter substrate. These two kinds of substrates were aligned such that the polarization directions of ultraviolet rays irradiating the respective substrates match with each other, and then were bonded.

Next, the bonded substrates were heated at 200° C. for 60 minutes in a furnace in which nitrogen gas is purged while applying a pressure of 0.5 kgf/cm² thereto, and thereby the seal material was cured.

A liquid crystal composition containing a liquid crystal material and a monomer was injected into a cell prepared with the above-described method under vacuum. In order to obtain the liquid crystal composition, 37% by weight of trans-4-propyl-4'-vinyl-1,1'-bicyclohexane with respect to the total weight of the entire liquid crystal composition; and 0.5% by weight of biphenyl-4,4'diylbis(2-methyl acrylate), as the monomer, with respect to the total weight of the entire liquid crystal composition were added to 4-cyano-4'-pentylbiphenyl which was the positive type liquid crystal material. That is, in the present example, as a liquid crystal component in the liquid crystal composition, mixed liquid crystal was used.

More specifically, as illustrated in the following chemical reaction formula (33-1) or (33-2), biphenyl-4,4'-diylbis(4-methyl acrylate) which is the monomer is excited to form radicals by irradiation with ultraviolet rays. That is, the monomer used in Example 5 is a monomer having function of a polymerization initiator to spontaneously start polymerization without a polymerization initiator.

[Chem. 33]

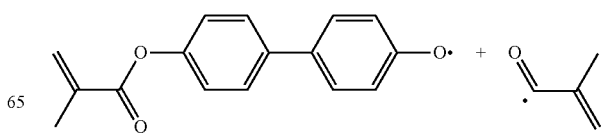

(33-1)

(33-2)

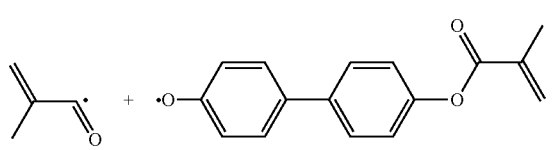

An inlet of a cell through which the liquid crystal composition was injected was blocked with an ultraviolet ray-curable resin (TB3026E, manufactured by ThreeBond Co., Ltd.) and was sealed by ultraviolet ray irradiation. The wavelength of ultraviolet rays applied for sealing was 365 nm, and light was blocked in pixel portions so as to remove the influence of ultraviolet rays as much as possible. At this time, electrodes were short-circuited and the charge of a surface of the glass substrate was eliminated such that the alignment of liquid crystal was not disordered by outside electric field.

Next, in order to remove the flow alignment of liquid crystal molecules, a realignment treatment of heating the liquid crystal panel at 130° C. for 40 minutes to make the liquid crystal molecules have isotropic phase was performed. As a result, a liquid crystal cell was obtained in which liquid crystal molecules were uniaxially aligned in the plane of the substrates in a direction perpendicular to the polarization direction of ultraviolet rays irradiating the alignment films.

Next, in order to subject this liquid crystal cell to the PS process, the liquid crystal cell was irradiated with ultraviolet rays having an intensity of 2 $J/cm^2$ using a black light unit (FHF32BLB, manufactured by TOSHIBA Corporation). As a result, biphenyl-4,4'-diylbis(2-methyl acrylate) was polymerized.

When a panel was manufactured using the liquid crystal cell of Example 5, alignment stability, particularly image sticking property could be improved without increasing driving voltage, lowering the contrast, and considerably lowering the voltage holding ratio.

EXAMPLE 6

FIG. 29 is also a plane view schematically illustrating an IPS substrate of Example 6. Example 6 is a preparation example of a liquid crystal cell of the IPS mode. An IPS substrate including a pair of ITO comb-teeth electrodes (pixel electrode and common electrode) and TFT; and a counter substrate were prepared, and a polyvinyl solution containing a cinnamate group as a photoreactive functional group, which was a material of an alignment film, was applied on the respective substrates by a spin coating method. As the photoreactive functional group, a chalcone group, a coumarin group, a stilbene group, and the like can be used other than this. Further, as the polymer to be a main chain, in addition to this, a partially or completely imidized polyimide or a polysiloxane can be used. As the glass substrate, #1737 (manufactured by Corning Inc.) was used. Subsequently, the respective substrates were left in condition of 90° C. for 1 minute to provisionally drying the applied solution. Next, the provisionally dried film was baked by leaving the respective substrates in condition of 200° C. for 40 minutes in a nitrogen atmosphere.

Next, an alignment treatment was carried out for the surface of each substrate by using the method (V-shaped exposure) according to Embodiment 1. Specifically, the same region was irradiated with p polarized light having a wavelength of 313 nm and a total amount of 100 $mJ/cm^2$ twice. The lights employed for the two times light irradiation were respectively applied from directions different at 180° and from slanting directions at 40° to the normal direction with respect to the substrate.

Next a thermosetting seal material (HC 1413EP: manufactured by Mitsui Chemicals, Inc.) was printed on one of the substrates using a screen plate. Furthermore, beads (SP-2035: manufactured by Sekisui Chemical Co., Ltd.) having a diameter of 3.5 μm were dispersed on the other substrate. The pair of substrates were aligned such that the polarization directions of ultraviolet rays irradiating the respective substrates become perpendicular to each other, and then were bonded.

Next, the bonded substrates were heated at 200° C. for 60 minutes in a furnace in which nitrogen gas was purged while applying a pressure of 0.5 $kgf/cm^2$ thereto, and thereby the seal material was cured.

A liquid crystal composition containing a positive type liquid crystal material and a monomer for PSA represented by the following chemical formula was injected into a cell prepared with the above-described method under vacuum. The mixing ratio of the monomer for PSA was set to 0.5% by weight with respect to the total weight of the entire liquid crystal composition.

An inlet of a cell through which the liquid crystal composition was injected was blocked with an ultraviolet ray-curable resin (TB3026E, manufactured by ThreeBond Co., Ltd.) and was sealed by ultraviolet ray irradiation. The wavelength of ultraviolet rays applied for sealing was 365 nm, and light was blocked in pixel portions so as to remove the influence of ultraviolet rays as much as possible.

Next, in order to remove the flow alignment of liquid crystal molecules, a realignment treatment of heating the liquid crystal cell at 130° C. for 40 minutes to make the liquid crystal layer have isotropic phase was performed.

Polarizing plates were attached respectively to the pair of substrates to complete a liquid crystal display panel of the IPS mode. The polarization axes of the polarizing plates in both substrates were adjusted so as to be perpendicular to each other.

Next, in order to carry out PSA polymerization process for the liquid crystal cell, liquid crystal layer was irradiated with back light for 100 hours through the polarizing plates in a no voltage application state to polymerize the monomer in the liquid crystal layer. The light applied from back light was visible light, and thus the light was not cut by the polarizing plates.

In Example 6, the monomers represented by the following chemical formulae (34) and (35) were mixed at 1:1 by weight and then used. A compound represented by the following chemical formula (34) is a benzyl-based bifunctional methacrylate monomer (4,4'-dimethacryloyloxybenzyl) and a compound represented by the following chemical formula (35) is a phenanthrene-based bifunctional methacrylate monomer (phenanthrene-2,7-diylbis(2-methyl acrylate)). The compound represented by the following chemical formula (35) scarcely shows polymerization even when visible light is applied, whereas the compound represented by the following chemical formula (34) includes a structure for generating radicals by visible light irradiation, and also functions as an initiator.

[Chem. 34]

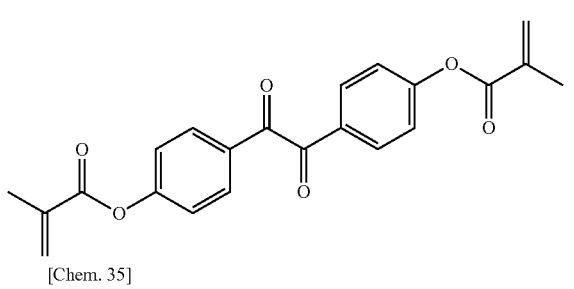

(34)

[Chem. 35]

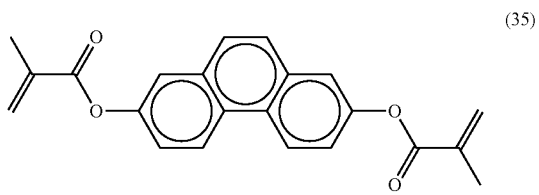

(35)

Figure 31:
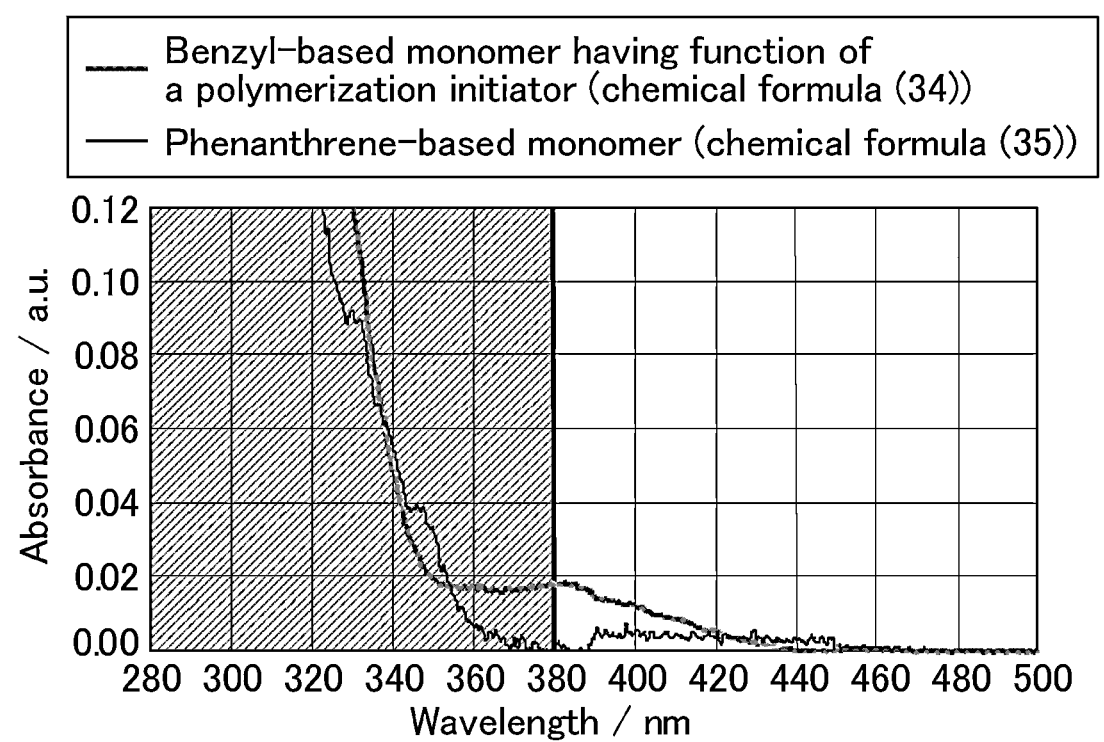
FIG. 31 is a graph illustrating absorption spectra of monomers represented by the chemical formulae (34) and (35) below.

FIG. 31 is a graph showing absorption spectra of monomers represented by the chemical formulae (34) and (35). In the present embodiment, the PSA polymerization process is carried out by back light which passes through the polarizing plates, and thus light with a short wavelength shorter than wavelength of 380 nm is cut by the polarizing plates (the portion left side of the boundary line of 380 nm in FIG. 31). As illustrated in FIG. 31, the benzyl-based monomer represented by the chemical formula (34) absorbs light with a wavelength of 380 nm or longer. On the other hand, the phenanthrene-based monomer represented by the chemical formula (35) scarcely absorbs light with a wavelength of 380 nm or longer. Even in such as case, the benzyl-based monomer represented by the chemical formula (34) generates radicals to be active species and the polymerization of the phenanthrene-based monomer represented by the chemical formula (35) proceeds in the present embodiment. Further the benzyl-based monomer represented by the chemical formula (34) itself is also polymerized by the radicals to form a portion of the PSA layer. That is, the monomer represented by the chemical formula (34) used in Example 6 is a monomer having function of a polymerization initiator to spontaneously start polymerization without a polymerization initiator.

When a panel was manufactured using the liquid crystal cell of Example 6, alignment stability, particularly image sticking property could be improved without increasing driving voltage, lowering the contrast, and considerably lowering the voltage holding ratio.

In Example 6, irradiation in the PS process was carried out with visible light. Accordingly, damages on the liquid crystal layer and the photo-alignment film can be suppressed as compared to those in the case of using ultraviolet rays. In the photo-alignment film of Example 6, polyvinyl cinnamate including a double bond was used, and thus it is supposed that the cinnamate group could further contribute to promotion of photopolymerization for the PS layer and uniform layer formation since the cinnamate group was subjected to light excitation to provide radicals.

In Example 6, the irradiation energy for photo-alignment treatment was set to 100 mJ/cm$^2$, but the alignment can be stabilized by the PS process even with irradiation energy of 100 mJ/cm$^2$ or lower, and thus there is no problem for practical application. Rather, lowering of the irradiation energy is desirable since the photodeterioration of other members can be suppressed. Specifically, even if the irradiation energy is lowered to 10 mJ/cm$^2$, it is supposed that the same effect can be obtained.

EXAMPLE 7

FIG. 29 is also a plane view schematically illustrating an IPS substrate of Example 7. Example 7 is a preparation example of a liquid crystal cell of the IPS mode. An IPS substrate including a pair of comb-teeth electrodes which are transparent electrodes (pixel electrode and common electrode) and TFT; and a bare glass substrate (counter substrate) were prepared. A polyimide solution including a cyclobutane skeleton, which was a material of a horizontal alignment film, was applied on the respective substrates by a spin coating method. As the glass, #1737 (manufactured by Corning Inc.) was used. In the comb-teeth electrodes, a common electrode and a pixel electrode extend substantially parallel to each other and are respectively formed in a zigzag shape as in Example 1. As a result, since the electric field vector during electric field application is substantially perpendicular to a lengthwise direction of the electrodes, a multidomain structure is formed and thus superior viewing angle characteristics can be obtained. As a material of the comb-teeth electrodes, IZO was used. The electrode width L of the comb-teeth electrodes was 3 µm and the distance S between the electrodes was 9 µm. The polyimide solution including a cyclobutane skeleton was prepared by equimolecular polymerization of 1,2,3,4-cyclobutane tetracarboxylic dianhydride and a diamine compound. In Example 7, the alignment principle was photodissociation of cyclobutane.

After application by a spin coating method, provisional drying was performed at 90° C. for 1 minute, followed by baking at 200° C. for 60 minutes while purging nitrogen gas. The thickness of the alignment films after baking was 100 nm.

Next, an alignment treatment was carried out for the surface of each substrate by using the method (V-shaped exposure) according to Embodiment 1. Specifically, the same region was irradiated with polarized ultraviolet rays having a wavelength of 254 nm and a total amount of 500 mJ/cm$^2$ twice. The lights employed for the two times light irradiation were respectively applied from directions different at 180° and from slanting directions at 40° to the normal direction with respect to the substrate. At this time, an angle formed between the lengthwise direction of the comb-teeth electrodes and the polarization direction was set to ±15°.

Next, a thermosetting seal material (HC1413EP, manufactured by Mitsui Chemicals, Inc.) was printed on the IPS substrate using a screen plate. Furthermore, in order to obtain the liquid crystal layer having a thickness of 3.5 µm, beads (SP-2035, manufactured by Sekisui Chemical Co., Ltd.) having a diameter of 3.5 µm were dispersed on the counter substrate. These two kinds of substrates were aligned such that the polarization directions of ultraviolet rays irradiating the respective substrates match with each other, and then were bonded.

Next, the bonded substrates were heated at 200° C. for 60 minutes in a furnace in which nitrogen gas was purged while applying a pressure of 0.5 kgf/cm$^2$ thereto, and thereby the seal material was cured.

A liquid crystal composition containing a liquid crystal material and a monomer was injected into a cell prepared with the above-described method under vacuum. As the liquid crystal material, a negative type liquid crystal which contains liquid crystal molecules including a multiple bond other than a benzene ring was used. As the monomer, biphenyl-4,4'-diylbis(2-methyl acrylate) was used. The amount of biphenyl-4,4'-diylbis(2-methyl acrylate) added is 0.5% by weight with respect to the total weight of the entire liquid crystal composition.

An inlet of a cell through which the liquid crystal composition was injected was blocked with an ultraviolet ray-curable resin (TB3026E, manufactured by ThreeBond Co., Ltd.) and was sealed by ultraviolet ray irradiation. The wavelength of ultraviolet rays applied for sealing was 365 nm, and light was blocked in pixel portions so as to remove the influence of ultraviolet rays as much as possible. At this time, electrodes were short-circuited and the charge of a surface of the glass substrate was eliminated such that the alignment of liquid crystal was not disordered by outside electric field.

Next, in order to remove the flow alignment of liquid crystal molecules, a realignment treatment of heating the liquid crystal cell at 130° C. for 40 minutes to make the liquid crystal molecules have isotropic phase was performed. As a result, a liquid crystal cell was obtained in which liquid crystal molecules were uniaxially aligned in the plane of the substrates in a direction perpendicular to the polarization direction of ultraviolet rays irradiating the alignment films.

Next, in order to subject this liquid crystal cell to the PS process, the liquid crystal cell was irradiated with ultraviolet rays having an intensity of 2 $J/cm^2$ using a black light unit (FHF32BLB, manufactured by TOSHIBA Corporation). As a result, biphenyl-4,4'-diylbis(2-methyl acrylate) was polymerized.

When a panel was manufactured using the liquid crystal cell of Example 7, alignment stability, particularly image sticking property could be improved without increasing driving voltage, lowering the contrast, and considerably lowering the voltage holding ratio.

In Example 7, as the monomer, biphenyl-4,4'-diylbis(2-methyl acrylate) was used, but even if the respective monomers described in Example 6 were used, the same effect can be obtained.

In Example 7, the irradiation energy for photo-alignment was set to 500 $mJ/cm^2$, but the alignment can be stabilized by the PS process even with irradiation energy of 500 $mJ/cm^2$ or lower, and thus there is no problem for practical application. Rather, lowering of the irradiation energy is desirable since the photodeterioration of other members can be suppressed. Specifically, even if the irradiation energy is lowered to 100 $mJ/cm^2$, it is supposed that the same effect can be obtained.

REFERENCE EXAMPLE 3

A liquid crystal cell of Reference Example 3 was prepared in the same manner as in Example 7, except that no PS process was carried out. As a result, the alignment property was insufficient and the image sticking was observed.

Further investigations were performed to find that, in order to obtain sufficient alignment properties without executing the PS process, irradiation energy of about 2 $J/cm^2$ was necessary. However, high energy irradiation around 254 nm causes photodissociation of other parts in the alignment film and photodissociation of a color filter, and thus causes a problem on long time reliability. Consequently, it was found that the method employing the PS process as Example 7 could solve the problem on the reliability.

As a material for a semiconductor layer included in the TFT in Examples 1 to 7, an oxide semiconductor having high mobility such as indium-gallium-zinc-oxide (IGZO) is preferable. By using IGZO, the size of a TFT element can be reduced as compared to a case of using amorphous silicon, which is suitable for a high-resolution liquid crystal display. In the case of applying rubbing process to the substrate including a TFT element, highly precise and uniform rubbing in a pixel is difficult since the pile density of a rubbing cloth is limited, and there is a concern of inferiority of display quality. In this point, it can be said that a photo-alignment technique excellent in uniform alignment is useful for actual application of an oxide semiconductor such as IGZO. However, on the other hand, in the case of an oxide semiconductor such as IGZO, there is a concern of shift of semiconductor threshold properties by ultraviolet ray irradiation during photo-alignment treatment. This shift of properties results in change of the TFT element properties of a pixel and may affect the display quality. Further, a monolithic driver element formed on such an oxide semiconductor substrate with high mobility may possibly be affected more significantly. In contrast, it can be said that the irradiation amount of ultraviolet rays with short wavelength needed for the photo-alignment can be lowered to the minimum according to Examples 1 to 7, and the method is therefore particularly useful for the case of using an oxide semiconductor such as IGZO.

The present application claims priority to Patent Application No. 2011-186445 filed in Japan on Aug. 29, 2011 under the Paris Convention and provisions of national law in a designated State, the entire contents of which are hereby incorporated by reference.

REFERENCE SIGN LIST

11: substrate
12: protrusion
13: insulating film
14: film containing photo-alignment film material
20: incident surface
21: scanning signal line
22: data signal line
23: TFT
24: pixel electrode
26: black matrix
27: color filter
30, 90: liquid crystal layer
32, 42: alignment film
33a, 43a: polymerizable monomer (non-excited)
33b, 43b: polymerizable monomer (excited state)
52: photoactive group (vertical alignment film molecules)
53, 63, 93, 103: polymerizable monomer
54, 64, 171, 271, 374, 474: liquid crystal molecules
55: hydrophobic group
62: photoactive group (horizontal alignment film molecules)
70: array substrate
71, 81: transparent substrate
72, 82: horizontal alignment film
73, 83: PS layer (polymer layer)
80: color filter substrate
110, 210: substrate
111, 211: region to be panel
120: region corresponding to shape of light transmission part
121, 221: first region
122, 222: second region
123, 223: third region
124, 224: fourth region
125, 225: fifth region 126, 226: sixth region
130, 230: exposure apparatus
131, 231: exposure head
132, 232: exposure stage
133, 233: table
134, 234a, 234b: light source
135, 235: photographing unit
141, 241: proximity gap
150, 250: photo mask
151, 251: light transmission part
152, 252: light shielding part
153: main region
154: sub region
236a: first exposure unit
236b: second exposure unit
251a: first light transmission part
251b: second light transmission part
371, 471: pixel electrode
372, 472: common electrode
471a: slit

The invention claimed is:

1. A method for manufacturing a liquid crystal display device comprising:
   a step of forming a horizontal alignment film by carrying out a photo-alignment treatment of irradiating a photo-alignment film material applied to at least one substrate of a pair of substrates with light, wherein
   the photo-alignment treatment is a treatment of separately irradiating the same region with light two or more different times from a slanting direction with respect to a surface of the at least one substrate of the pair of substrates, and
   at least two lights applied two or more times in the photo-alignment treatment are polarized lights applied from directions mutually different at 90° or greater.

2. The method for manufacturing a liquid crystal display device according to claim 1,
   wherein the at least two of the lights applied two or more different times are applied from directions mutually different at 150° to 210°.

3. The method for manufacturing a liquid crystal display device according to claim 1,
   wherein an error of an incident angle of the at least two of the lights applied two or more different times is within 45°.

4. The method for manufacturing a liquid crystal display device according to claim 1,
   wherein at least one of the lights applied two or more different times has an incident angle of 10° to 60°.

5. The method for manufacturing a liquid crystal display device according to claim 1,
   wherein any of the lights applied two or more different times has an incident angle of 10° to 60°.

6. The method for manufacturing a liquid crystal display device according to claim 1,
   wherein at least one of the lights applied two or more different times is P polarized light.

7. The method for manufacturing a liquid crystal display device according to claim 1,
   wherein the method further comprises a step of forming a polymer layer that controls alignment of liquid crystal molecules adjacent thereto on the horizontal alignment film by irradiating a liquid crystal composition containing a liquid crystal material and a monomer and being injected between the pair of substrates with light to polymerize the monomer.

8. The method for manufacturing a liquid crystal display device according to claim 7,
   wherein the liquid crystal material includes liquid crystal molecules containing, in a molecular structure thereof, a multiple bond other than conjugated double bonds of a benzene ring.

9. The method for manufacturing a liquid crystal display device according to claim 1,
   wherein the photo-alignment film material includes a compound containing either or both of a photoisomerizable functional group and a photodimerizable functional group.

10. The method for manufacturing a liquid crystal display device according to claim 1,
    wherein the photo-alignment film material includes a compound containing at least one functional group selected from a group consisting of an azo group, a chalcone group, a stilbene group, and a coumarin group.

11. The method for manufacturing a liquid crystal display device according to claim 1,
    wherein the photo-alignment film material includes a compound containing a cinnamate group.

12. The method for manufacturing a liquid crystal display device according to claim 1,
    wherein an alignment mode of the liquid crystal display device is an IPS mode.

13. The method for manufacturing a liquid crystal display device according to claim 1,
    wherein an alignment mode of the liquid crystal display device is an FFS mode.

14. The method for manufacturing a liquid crystal display device according to claim 1, wherein the at least two lights applied two or more different times have substantially the same incident angle.

15. The method for manufacturing a liquid crystal display device according to claim 1,
    wherein the photo-alignment film material is applied to each of the substrates,
    the photo-alignment treatment is carried out on each of the substrates,
    the at least two lights applied two or more different times are polarized ultraviolet rays, when the optical axis of each of the polarized ultraviolet rays applied to one of the substrates is projected to the substrate surface, the directions of the projected optical axes are substantially parallel to the extension direction of a data signal line on the substrate, and
    when the optical axis of each of the polarized ultraviolet rays applied to the other substrate is projected to the substrate surface, the directions of the projected optical axes are substantially parallel to the extension direction of a black matrix on the substrate.

* * * * *